(12) United States Patent
Aiyer

(10) Patent No.: US 11,561,080 B2
(45) Date of Patent: Jan. 24, 2023

(54) OPTICAL SENSOR FOR SURFACE INSPECTION AND METROLOGY

(71) Applicant: Arun Anath Aiyer, Fremont, CA (US)

(72) Inventor: Arun Anath Aiyer, Fremont, CA (US)

( * ) Notice: Subject to any disclaimer, the term of this patent is extended or adjusted under 35 U.S.C. 154(b) by 0 days.

(21) Appl. No.: 17/880,361

(22) Filed: Aug. 3, 2022

(65) Prior Publication Data

US 2022/0381550 A1 Dec. 1, 2022

Related U.S. Application Data

(63) Continuation-in-part of application No. 17/704,961, filed on Mar. 25, 2022, now Pat. No. 11,442,025.

(60) Provisional application No. 63/166,655, filed on Mar. 26, 2021.

(51) Int. Cl.
*G01B 9/02* (2022.01)
*G01B 11/22* (2006.01)

(52) U.S. Cl.
CPC .......... *G01B 9/02041* (2013.01); *G01B 11/22* (2013.01)

(58) Field of Classification Search
CPC ............... G01B 9/02041; G01B 11/22; G01B 9/02002; G01N 21/9501; G01N 21/8806; G01N 21/8851
USPC ....................... 356/237.1–237.6, 239.1–239.8
See application file for complete search history.

(56) References Cited

U.S. PATENT DOCUMENTS

| | | | |
|---|---|---|---|
| 3,930,730 | A | 1/1976 | Laurens et al. |
| 6,084,673 | A | 7/2000 | Van Den Brink et al. |
| 6,416,912 | B1 | 7/2002 | Kobayashi et al. |
| 2007/0002333 | A1 | 1/2007 | Ueki et al. |
| 2011/0281069 | A1 | 11/2011 | Otsuka et al. |
| 2019/0128823 | A1 | 5/2019 | Berlatzky et al. |

FOREIGN PATENT DOCUMENTS

WO 2016056996 A1 4/2016

OTHER PUBLICATIONS

International Search Report and Written Opinion dated Aug. 30, 2022 in PCT/US2022/022025 (10 pages).
Takalo et al., Tutorial on Univariate Autoregressive Spectral Analysis, Journal of Clinical Monitoring and Computing (2005) 19: 401-410 DOI: 10.1007/s10877-005-7089-x, 10 pages.

(Continued)

*Primary Examiner* — Tri T Ton
(74) *Attorney, Agent, or Firm* — Young Law Firm, P.C.

(57) ABSTRACT

A method of improving axial resolution of interferometric measurements of a 3D feature of a sample may comprise illuminating the feature using a first limited number of successively different wavelengths of light at a time; generating an image of at least the 3D feature based on intensities of light reflected from the feature at each of the successively different wavelengths of light; measuring a fringe pattern of intensity values for each corresponding pixel of the generated images; resampling the measured fringe patterns as k-space interferograms; estimating interference fringe patterns for a spectral range that is longer than available from the generated images using the k-space interferograms; appending the estimated interference fringe patterns to the respective measured fringe patterns; and measuring the height or depth of the 3D feature using the measured interference fringe patterns and appended estimated fringe patterns.

7 Claims, 10 Drawing Sheets

(56) References Cited

OTHER PUBLICATIONS

Chukiet Sodsri, Time-Varying Autoregressive Modelling for Nonstationary Acoustic Signal and Its Frequency Analysis, The Pennsylvania State University The Graduate School Graduate Program in Acoustics, Submitted in Partial Fulfillment of the Requirements for the Degree of Doctor of Philosophy Dec. 2003, 118 pages.

Marple, Larry, Resolution of Convention Fourier, autoregressive, and Special ARMA Methods of Spectrum Analysis, Argosystems, Inc., 4 pages.

Schlindwein et al., Autoregressive spectral analysis as an alternative to fast Fourier transform analysis of Doppler ultrasound signals, Diagnostic Vascular Ultrasound (pp. 74-84) Chapter: 8 Publisher: Edward Arnold, 11 pages.

Liu et al., Spectral estimation optical coherence tomography for axial super-resolution, revised Sep. 11, 2015; accepted Sep. 28, 2015; published Oct. 1, 2015, Oct. 5, 2015 | vol. 23, No. 20 | DOI:10.1364/OE.23.026521 | Optics Express 26521, 12 pages.

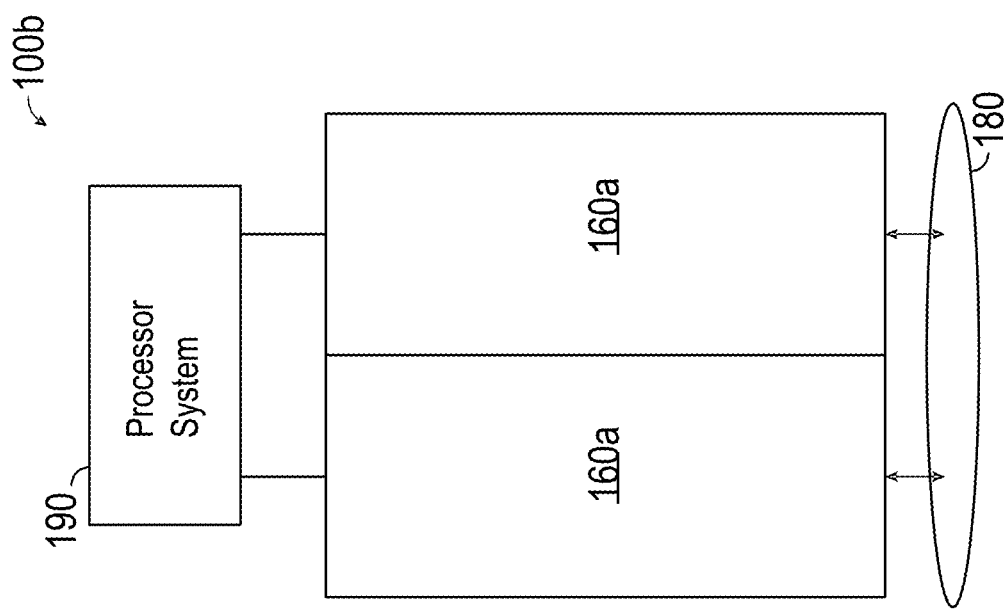

OPTICAL SENSOR FOR SURFACE INSPECTION AND METROLOGY

FIELD OF THE INVENTION

The embodiments discussed in this disclosure are related to an imager and imaging interferometer.

BACKGROUND OF THE INVENTION

An interferometer utilizes superimposed waves, such as visible light or electromagnetic waves from other spectral regions, to extract information about the state of the superimposed waves. The superimposition of two or more waves with the same frequency may combine and add coherently. The resulting wave from the combination of the two or more waves may be determined by the phase difference between them. For example, waves that are in-phase may undergo constructive interference while waves that are out-of-phase may undergo destructive interference. The information extracted from the coherently added waves may be used to determine information about a structure that interacts with the waves. For example, interferometers may be used for measurement of small displacements, refractive index changes, and surface topography. In imaging interferometer, interferometric measurements over a finite area of the surface, instead of a point on the surface, is achieved by using imaging sensors. An imager utilizes reflected and scattered waves, such as visible light or electromagnetic waves from other spectral regions, to extract information about the state, location, and topology of surface defects.

The subject matter claimed in this disclosure is not limited to embodiments that solve any disadvantages or that operate only in environments such as those described above. Rather, this background is only provided to illustrate one example technology area where some embodiments described in this disclosure may be practiced.

SUMMARY OF THE INVENTION

According to an aspect of one or more embodiments, an interferometer may include tunable light sources, splitters, digital imagers, and processor systems. The tunable light source may be configured to emit a light beam. The splitters may be configured to direct the beam toward a sample with a reference plate, a raised surface feature and a feature floor surface. According to an embodiment, a first digital imager may be configured to receive a reflected beam to generate an interference pattern and to generate an image based on the reflected beams. The reflected beam may be a coherent addition of a first reflection of the beam off the surface of the reference plate, a second reflection of the beam off the raised surface feature and a third reflection off the floor of the sample or substrate on which features are located. The processor system may be coupled to the digital imager and may be configured to determine a distance between the reference surface and the raised surface features based on the generated image or images.

According to an aspect of one or more embodiments, methods of determining the thickness of a sample are also disclosed. The methods may include emitting a light beam and directing the light beam toward a sample with a floor surface and a feature surface. The methods may also include generating an image based on a reflected light beam. The reflected light beam may be a coherent addition of a first reflection of the light beam off the reference plate, a second reflection of the light beam off of the top surface of the sample and a third reflection of the light beam off of the bottom surface of the sample. The method may also include determining a thickness between the top surface and the bottom surface based on the reflections.

A second digital imager may be configured to receive reflected and scattered beams to generate an image of protruding features and the sample floor on which the features are positioned. The processor system may be coupled to the second digital imager and may be configured to build a two-dimensional image of the raised surface features and the floor of the sample.

One embodiment is a method, comprising emitting a first light beam of a first wavelength at a first time; directing the first light beam toward a reference plate and a first sample facing the reference plate, the first sample defining a floor surface and a raised surface feature rising above the floor surface; generating a first image based on a first reflected light beam, the first reflected light beam being a coherent addition of a first reflection of the first light beam off of the reference plate, a second reflection of the first light beam off of the raised surface feature and a third reflection of the first light beam off of the floor surface, and based on the generated first image, determining a distance between the surface of the reference plate and the raised surface feature and determining a distance between the surface of the reference plate and the floor surface.

According to further embodiments, the method may further comprise emitting a second light beam of a second wavelength at a second time different from the first time; directing the second light beam toward the first sample; generating a second image based on a reflected second light beam, the reflected second light beam being a coherent addition of a first reflection of the second light beam off of the reference plate, a second reflection of the second light beam off of the raised surface feature and a third reflection of the second light beam off of the floor surface, and based on the generated first and second images, determining the distance between the surface of the reference plate and the raised surface feature, and a distance between the reference plate and the floor surface.

The method may further comprise selecting a wavelength difference between the first wavelength and the second wavelength based on a distance between the floor surface and the raised surface feature; and selecting a first bandwidth of the first light beam and a second bandwidth of the second light beam based on a distance between the surface of the reference plate and different raised surface features on the first sample. According to one embodiment, determining the distance between the reference plate and the raised surface feature based on the first image and the second image may include constructing a fringe pattern based on first intensity values of pixels from the first image of and second intensity values from pixels of the second image; and performing a frequency domain transform on the constructed fringe pattern. For instance, the frequency domain transform may be a Fast Fourier Transform, Discrete Fourier Transform, a Discrete Cosine Transform or a Hilbert Transform.

In one embodiment, determining the distance between the reference plate and the raised surface feature based on the first image may comprise comparing an intensity of a pixel of the image to a plurality of model-based pixel intensities that correspond with respective different distances; and selecting one of the plurality of model-based pixel intensities that is closest to the intensity of the pixel, wherein the determined distance is the distance corresponding to the selected one of the plurality of model-based pixel intensities.

According to one embodiment, the first sample is part of a semiconductor formed on a wafer, and the method may further comprise emitting a second light beam; directing the second light beam toward a second sample of the semiconductor, the second sample being unilluminated by the first light beam and located on a different part of the semiconductor than the first sample; generating a second image based on a reflected second light beam, the reflected second light beam being a coherent addition of a first reflection of the second light beam off of the reference plate, of a second reflection of the second light beam off of a raised surface feature on the second sample and a third reflection of the second light beam off of the floor surface of the second sample; and based on the second image, determining second distances between the reference plate and the raised surface feature of the second sample, and between the reference plate and a floor surface of the second sample.

In one embodiment, an auto-correlation interferometer function may be carried out on at least the first reflected light beam.

According to some embodiments, directing the first light beam may comprise directing the first light beam toward the reference plate and the first sample at an angle normal or substantially normal to the reference plate. The method may also comprise a second light beam; directing the second light beam toward the reference plate and the first sample at angles away from normal to the floor surface of the sample; generating a second image based on a second reflected light beam, the second reflected light beam being a coherent addition of a second reflection/scatter of the second light beam off of the reference plate, a second reflection/scatter of the second light beam off of the raised surface feature and a third reflection/scatter of the second light beam off of the floor surface; and based on the generated second image, determining the distance between the reference plate and the raised surface feature and determining the distance between the reference plate and the floor surface.

Another embodiment is an optical system configured to measure raised surface features on a surface of a sample. The optical system may comprise a first digital imager and a second digital imager; a processor system coupled to the first and to the second digital imagers; a tunable light source configured to emit a first light beam and a second light beam; a first lens system (comprising one or more lenses) configured to focus incident light onto the sample surface and to focus reflected light back on the first and second digital imagers; a reference plate disposed above and facing the sample surface; an off-axis ring illuminator and configured to receive and direct the second light beam toward the reference plate at angles other than normal to the sample surface; a first beam splitter configured to direct the first light beam through the first lens system toward the reference plate in a direction normal to the sample surface and to transmit a first reflected light beam of the first light beam reflected by the reference plate and a second reflected light beam of the second light beam reflected by the a raised surface feature on the sample; a second beam splitter configured to transmit at least a portion of the first reflected light beam toward the first digital imager and to reflect at least a portion of the second reflected light beam toward the second digital imager; wherein the first digital imager is configured to generate a first digital image based at least on the first reflected light beam and wherein the second digital imager is configured to generate a second digital image based at least on the second reflected light beam, and wherein the processor system is configured to determine a distance between the reference plate and the raised surface feature of the sample based at least on the first and second digital images The first reflected light may comprise a coherent addition of reflections of the first light beam on the reference plate, on the raised surface feature and on the sample surface. Similarly, the second reflected light may comprise a coherent addition of reflections of the second light beam on the reference plate, on the raised surface feature and on the sample surface.

In one embodiment, the off-axis ring illuminator is disposed co-axially with the first lens system.

The processor system may be further configured to generate an image of the sample surface for defect inspection and to generate a fluorescence image of the sample for residue-defect inspection. According to some embodiments, the second beam splitter may include a dichroic mirror configured to primarily transmit a first pre-determined band of wavelengths and to primarily reflect a second pre-determined band of wavelengths, wherein the first light beam has a wavelength within the first pre-determined band of wavelengths and wherein the second light beam has a wavelength within the second pre-determined band of wavelengths.

According to an embodiment, the first digital imager and the second digital imager may be configured to generate digital images based on sample fluorescence emission, generated via excitation of the sample surface and of the raised surface feature by the first and second light beams.

The first and/or the second digital imagers may comprise, for example, a two-dimensional array of CCD or CMOS pixels or a one-dimensional line array of CCD or CMOS pixels having pixel readout rate ranging from tens of Hz to hundreds of kHz, such as from 10 Hz to 300 KHz.

The reference plate positioned above the sample surface may have an optical thickness configured to provide a near common path Mirau interferometer functionality.

The optical system may be further configured to optically scan the sample surface using a translation system whose travel speed across a field of view of the optical system determines a sampling pixel size of the first and second images. The translation system may be configured to move the sample across the field of view of the optical system and/or to move the optical system across the sample.

According to some embodiments, the first light beam has a first wavelength and is emitted at a first time, and the second light beam has a second wavelength that is different form the first wavelength and is emitted at a second time that is different than the first time. The processor system may be configured to determine the distance between the reference plate and the raised surface feature based on the first digital image and the second digital image. The tunable light source may be configured to emit a plurality of light beams, the plurality of light beams including the first light beam and the second light beam, each of the plurality of light beams having a different wavelength, a number of the plurality of light beams being selected based on the distance between the reference plate surface and the raised surface feature. The determined distance between the reference plate surface and the raised surface feature may then be based on a plurality of first and second images generated by the first and second digital imagers based on the plurality of light beams. The tunable light source may comprise a broadband light source configured to emit the first light beam at a first time and the second light beam at a second time; and a tunable filter that is configured to filter the first light beam to have a first wavelength and to filter the second light beam to have a second wavelength.

According to one embodiment, the distance between a reference surface on the sample or the reference plate and the raised surface feature may be determined based on a first intensity value of a first pixel location in the first digital image and a second intensity value of a corresponding first pixel location in the second digital image.

The first lens system may be positioned between the sample and the first beam splitter, and the optical system may further comprise a second lens system positioned between the first and the second beam splitters; and an adjustable system aperture positioned one in an aperture plane of the first lens system, or between the first lens system and the second lens system. The size of an aperture of the adjustable system aperture may be configured to be adjustable based on a lateral resolution and/or a field of view of the optical system.

In one embodiment, the first beam splitter may be movably controllable to redirect the first light beam away from the raised surface feature toward an other part of the sample, such that the raised surface feature is not illuminated (uni-lluminated) by the redirected first light beam and the processor system may be configured to determine a distance between the reference plate and the other part of the sample.

According to some embodiments, the second digital imager may be configured to receive at least a portion of the first light beam that includes a reflected light beam from normal incidence illumination and at least a portion of the second light beam that includes scattered light beam from off-axis illumination to generate at least one third digital image based on the reflected and scattered light beams and the processor system may be further configured to generate a two-dimensional digital image from the at least one third digital image.

In one embodiment, the sample may be moved under the imaging system by a x-y translation system comprising a moving stage and wherein the second digital imager may be configured to receive at least a portion of the first light beam that includes a reflected light beam from normal incidence and at least a portion of the second light beam that includes scattered light beam from off-axis illumination to generate third digital image(s) based on the reflected and scattered light beams. The processor system may be further configured to generate a two-dimensional digital image of an entire surface of the sample from the third digital image(s).

According to some embodiments, the tunable light source may be configured to emit a single wavelength of light beam toward the sample and to enable repeated multiple single wavelength inspection of the sample in both a bright field mode and in a dark field mode. The single wavelength of light beam incident on the sample surface may have a wavelength that causes the sample surface to fluoresce, and the second digital imager may be configured to receive a fluorescence emission from the sample surface via a first dichroic mirror as the sample is moved under the imaging system by translation system comprising a moving stage; and the second processor system may be configured to generate a two-dimensional digital image based on the received fluorescence emission.

The optical system may further comprise an auto-correlation interferometer comprising a first movable mirror and a second movable mirror both disposed along an optical path of the second reflected light beam and aligned with the second digital imager.

According to another embodiment, an optical system configured to measure a raised or receded surface feature on a surface of a sample may comprise a broadband light source; a tunable filter optically coupled to the broadband light source, the tunable filter being configured to filter broadband light emitted from the broadband light source and to generate a first light beam at a selected wavelength; a linewidth control element configured to receive the first light beam and to generate a second light beam having a predefined linewidth and a coherence length that is a function of a minimum height of the raised or receded surface feature on the sample; collimating optics optically coupled to the second light beam and configured to collimate the second light beam; collinearizing optics optically coupled to the collimating optics and configured to align the collimated second light beam onto the raised or receded surface feature of the sample, and a processor system and at least one digital imager configured to measure a height of the raised or receded surface from light reflected at least from the raised or receded surface.

According to further embodiments, the broadband light source may comprise a white light laser and/or an ultra-broadband source. The ultra-broadband source may comprise an arc lamp, a laser driven plasma source and/or a super luminescent diode (SLED). The tunable filter may be configured to generate different wavelengths of light having a finite linewidth at each wavelength. The broadband light source and the tunable filter may form a tunable light source that may be configured to generate the first light beam at a plurality of wavelength steps and such that the first light beam has a predetermined linewidth at each of the plurality of wavelength steps. The linewidth control element may comprise a plurality of interference filters, each of the plurality of interference filters having a defined passband. The linewidth control element may comprise a grating-based wavelength selector element. The linewidth control element may be configured to receive a controlled beam diameter of the first light beam. The optical system may further comprise a variable beam expander disposed between the tunable filter and the grating-based wavelength selector element, the variable beam expander being configured to selectively control a beam diameter of the first light beam incident upon the grating-based wavelength linewidth selector element. The variable beam expander may be configured to tune the coherence length of the second light beam for a given pitch and diffraction order of the grating-based wavelength selector element at any wavelength of the first light beam. The optical system may further be configured to image differing z-height ranges of a plurality of raised or receded surface features on a same or a different sample, through control of wavelengths of the first light beam by the tunable filter and through control, by the variable beam expander, of the beam diameter incident on the grating-based wavelength selector element. The tunable filter may comprise an acousto-optic tunable filter (AOTF).

Another embodiment is a method of measuring a height of a raised or receded surface feature on a surface of a sample. The method may comprise emitting a broadband light beam; selectively filtering the broadband light beam to generate a first light beam at a selected wavelength; controlling a linewidth of the first light beam to generate a second light beam having a predefined linewidth and a coherence length that is a function of a minimum height of the raised or receded surface feature on the sample; collimating the second light beam; collinearizing the collimated second light beam and directing the collinearized second light beam onto the raised or receded surface feature of the sample, and measuring the height of the raised or receded surface feature on a surface of a sample based upon light reflected at least from the raised or receded surface feature.

According to further embodiments, emitting may be carried out using a white light laser and/or an ultra-broadband source. The ultra-broadband source may comprise an arc lamp, a laser driven plasma source and/or a super luminescent diode (SLED). Selectively filtering may be carried out using a tunable filter configured to generate different wavelengths of light having a finite linewidth at each wavelength. Emitting and selectively filtering, according to an embodiment, may be carried out such that the first light beam has a predetermined linewidth at each of a plurality of wavelength steps. Controlling the linewidth of the first light beam may be carried out by passing the first light beam selectively through one of a plurality of interference filters, each of the plurality of interference filters having a defined passband. Controlling the linewidth of the first light beam may be carried out using a grating-based wavelength selector element. The method may further comprise selectively controlling a beam diameter of the first light beam incident upon the grating-based wavelength selector element. The method may further comprise tuning, by variable beam expander, the coherence length of the second light beam for a given pitch and diffraction order of the grating-based wavelength selector element at any wavelength of the first light beam. The method may further comprise imaging differing z-height ranges of a plurality of raised or receded surface features on a same or a different sample by successively controlling wavelengths of the first light beam, and controlling of a diameter of the first light beam incident on the grating-based wavelength selector element. Selectively filtering may comprise selectively filtering the first light beam according to a frequency of an acoustic input signal.

A still further embodiment is a method of improving axial resolution of interferometric measurements of a raised feature and a floor feature of a sample. According to one embodiment, the method may comprise illuminating the features of the sample using a first limited number of successively different wavelengths of light at a time; generating an image of at least the feature based on intensities of light reflected from the feature at each of the successively different wavelengths of light; measuring a fringe pattern of intensity values for each corresponding pixel of the generated images; resampling the measured fringe patterns as k-space interferograms; estimating interference fringe patterns for a spectral range that is longer than available from the generated images based on the first limited number of successively different wavelengths of light using the k-space interferograms; appending the estimated interference fringe patterns to the respective measured fringe patterns of intensity values generated from illuminating the raised feature of the sample using the first limited number of successively different wavelengths of light; measuring the height of the raised feature using the measured interference fringe patterns and appended estimated fringe patterns with improved axial resolution to simulate the effects of illuminating a top and a floor of the raised feature of the sample using a second limited number of successively different wavelengths of light, the second limited number of successively different wavelengths of light being greater than the first limited number of successively different wavelengths of light.

According to further embodiments, estimating the fringe patterns may comprise modelling the k-space interferograms using an algebraic model of k-space intensities having a plurality of coefficients and using the plurality of coefficients to generate the estimated fringe patterns. The algebraic model of k-space intensities, according to one embodiment, may be expressed as $I(k)=A[1+B \cdot Cos(C)]$ where, $A=(I_{max}+I_{min})/2$ is a DC amplitude of the plotted fringe pattern, $B=(I_{max}-I_{min})/(I_{max}+I_{min})$ is a fringe visibility, and where $C=2k \cdot d$, is the phase factor at each wavelength for a distance d. Measuring the height of the raised feature may, according to one embodiment, include applying a discrete frequency domain transformation to the plotted interference fringe pattern and appended estimated fringe patterns. Measuring the height of the raised feature may include applying a model-based fringe analysis technique. The discrete frequency domain transformation may be, for example, a Fast Fourier Transform (FFT) or a Hilbert Transform. Measuring the height of the raised feature using the plotted interference fringe pattern and appended estimated fringe patterns may introduce a fixed bias error and the method may further comprise cancelling out the introduced fixed bias error. Illuminating may be carried out by a light source and the method may comprise moving the sample past the light source at a first speed that is proportional to first limited number of successively different wavelengths of light and not at second, slower speed proportional to the second limited number of successively different wavelengths of light. The method may further comprise carrying out an iterative process to minimize a least-square criterion between measured interference fringe patterns and the appended estimated fringe patterns.

The object and advantages of the embodiments will be realized and achieved at least by the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

Exemplary embodiments will be described and explained with additional specificity and detail through the use of the accompanying drawings in which:

FIG. 1B illustrates multiple interferometer sub-systems according to an embodiment;

DESCRIPTION OF EMBODIMENTS

Figure 1A:
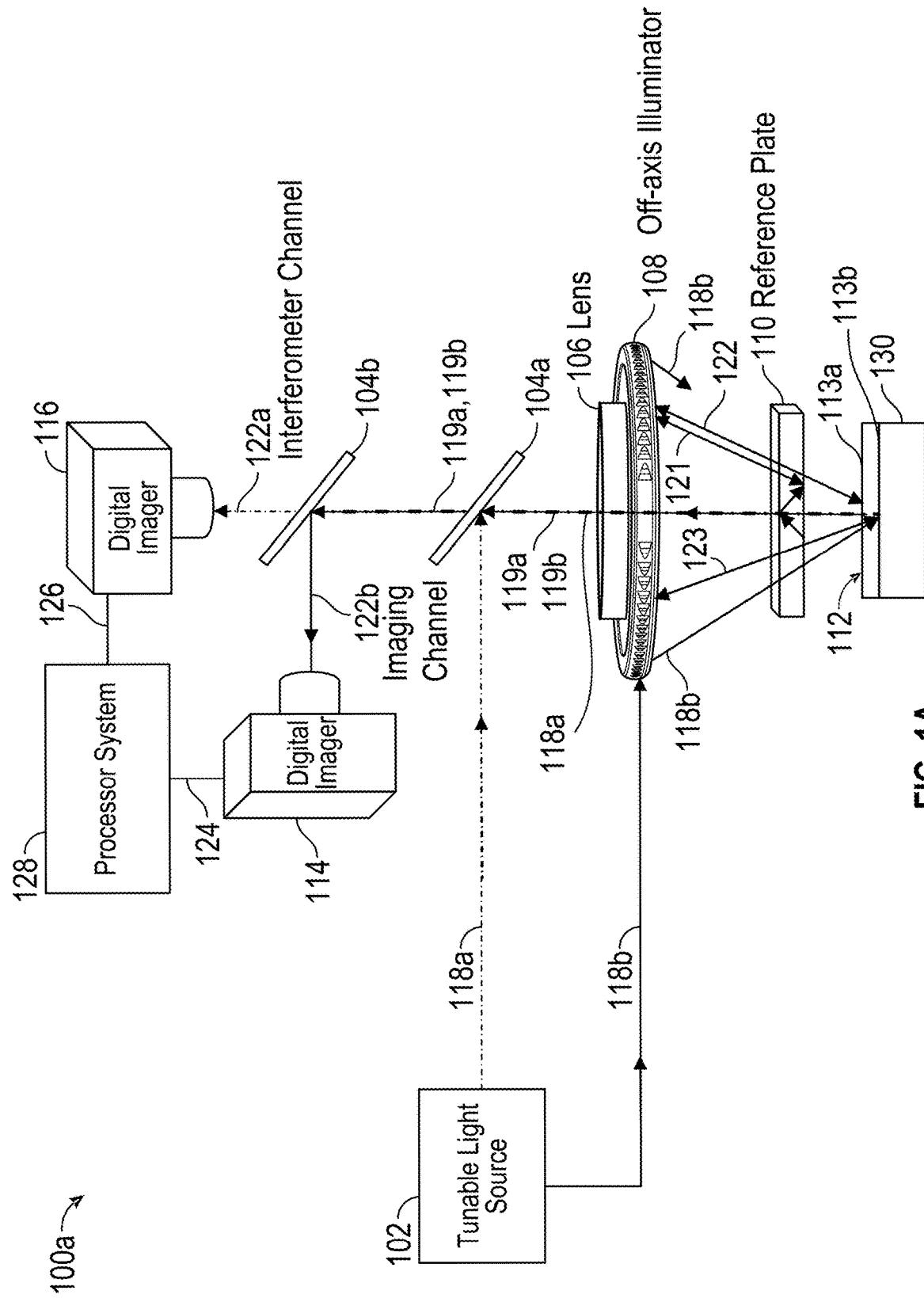
FIG. 1A illustrates an example interferometer system according to an embodiment.

According to at least one embodiment, an interferometer system may include a tunable light source, a beam direction unit, an imaging lens assembly, a digital imager, and a processor system. The interferometer may be configured to determine a distance between a reference surface, a raised surface feature and floor surface of a sample. The sample may be a portion of a surface of a semiconductor device constructed or formed on a wafer. In some embodiments, the reference surface may be a top surface of the wafer and the feature surface may be a top surface of the semiconductor device formed on the wafer. In other embodiments, the reference surface may be a transparent surface not part of the wafer and the raised surface feature may be a top surface or floor surface of the semiconductor device built on the wafer.

In some embodiments, the tunable light source may be configured to emit a light beam with a first wavelength at a first time. The beam splitter may be configured to direct the beam toward the sample. The beam may reflect off the sample. In some embodiments, the beam may reflect off a reference surface to generate a first reflected beam. The beam may also reflect off the raised surface feature to generate a second reflected beam and a third reflected beam off of the reference surface, such as a reference plate. The first, second and third reflected beams may add together coherently to form a reflected imaging beam that is received by the digital imager. The digital imager may be configured to generate a digital image based on an intensity of the reflected imaging beam.

The tunable light source may be configured to emit multiple other light beams, each at a different time. Each of the multiple other light beams may have a different wavelength. A digital image may be generated by the digital imager for each of the multiple other light beams in a similar manner as the digital image was generated for the light beam with the first wavelength.

The processor system may be configured to receive and compare the digital images from the digital imager or imagers. Based on the comparison between intensity values at the same pixel locations in the digital images, the processor system may be configured to determine a distance between the reference surface or reference plate and different raised surface features and floor surface on the sample.

In some embodiments, the sample may be a single location. Alternately or additionally, the sample may correspond to an area of the semiconductor. In these and other embodiments, the processor system may be configured to determine a topology of the sample over the area of the semiconductor based on the digital images. The topology may represent the distance between the reference plate and the floor of the sample and the distance between the reference plate and the raised surface features over the area of the semiconductor substrate.

In some embodiments, the interferometer may include one or more lenses or lens systems and an adjustable system aperture in the imaging path (i.e., the path of the reflected light beams). The lens or lenses may be configured to focus the imaging beam on the digital imagers. The adjustable system aperture may be configured to adjust the spatial resolution of the imaging system. In these and other embodiments, the field of view of the digital imagers may correspond to the area of the semiconductor substrate for which the distances between the reference plate and the raised surface features over the area of the semiconductor substrate are to be determined.

In some embodiments, a system may include multiple interferometer systems. In these and other embodiments, each of the systems may determine a distance between a reference surface on the sample (or a separate reference plate) and a feature surface of the semiconductor for different portions of the semiconductor at the or nearly the same time. In this manner, a topology of an entire semiconductor may be more quickly determined than when using a single interferometer.

In some embodiment, the interferometric imaging system may be configured to include a separate imaging channel that incorporates a second digital imager configured to generate a digital image based on an intensity of the return beam reflected and scattered from the sample surface.

Embodiments of the present disclosure will be explained with reference to the accompanying drawings.

FIG. 1A illustrates an exemplary system 100a (the "system 100a"), arranged in accordance with at least some embodiments described in this disclosure. The system 100a may be configured to image a raised surface feature 113a on sample 112 that is part of, for example, a semiconductor device 130. To generate the sample surface image, the system 100a may include a tunable light source 102, a beam splitter 104a for on-axis beam 118a, an off-axis ring illuminator 108 for off-axis beams 118b, digital imagers 114 and 116, and a processor system 128.

The system 100a may also be configured, using light beams, to determine a distance between the raised surface feature 113a and the floor surface 113b, with respect to a reference plate 110, of sample 112 that is part of a semiconductor device 130. According to embodiments, the reference plate 110 may be coated for partial reflectance and partial transmittance and may be disposed facing and in close proximity (e.g., 100 microns away to a few millimeters away) from the sample 112. The (in one embodiment, static) reference plate 110 may be configured to function as a reference mirror of a Mirau interferometer. The reference plate 110, in this manner, may be positioned above the surface of the sample 112, which may be moved under the optical system 100a by an x-y translation system including a moving stage.

The system 100a may be deployed in any suitable application where a distance is to be measured. For example, in some embodiments, the raised surface feature 113a may be top surface feature of a semiconductor device 130 and the floor surface 113b may be a top or bottom or floor surface of a silicon substrate wafer that forms a substrate of the semiconductor device 130. In these and other embodiments, the semiconductor device 130 may be any circuit, chip, or device that is fabricated on a silicon wafer. The semiconductor device 130 may include multiple layers of the same or different materials between the raised surface feature 113a and the floor surface 113b. Alternately or additionally, the raised surface feature 113a may be a micro electromechanical systems (MEMS) structure and the floor surface 113b may be a surface on which the MEMS structure is built.

Alternately or additionally, the raised surface feature 113a may be any type of interconnect feature used in 3D packaging and the floor surface 113*b* may be the corresponding surface from which the interconnect features protrude. An example of a protruding feature and a reference surface is described with respect to FIG. 4. Alternately or additionally, the raised surface feature 113*a* may be an embedded surface within a semiconductor device or some other device and the reference surface 113*b* may be a top surface. An example of an embedded surface is described with respect to FIG. 5. Although FIGS. 1, 2, 4 and 5 illustrate certain feature surface configurations, the principles and operation of the systems described in FIGS. 1, 2, 4 and 5 may be applied to any feature surface configuration.

Alternately or additionally, the raised surface feature 113*a* may be any type of interconnect feature used in 3D packaging protruding from surface 113*b* and the reference surface may be determined relative to the reference plate 110. Indeed, distances to 113*a* and 113*b* may be measured with respect to the reference plate 110. An example of a protruding feature and a reference surface is described with respect to FIG. 4. Alternately or additionally, the raised surface feature 113*a* may be an embedded surface within a semiconductor device or some other device and the reference surface may be a top surface. In this manner, the phrase "raised surface feature", as used herein, may refer to structures rising above or disposed below the floor or some other reference surface of the sample. An example of an embedded surface is described with respect to FIG. 4. Although FIGS. 1, 2, 4 and 5 illustrates certain feature surface configurations, the principles and operation of the systems described in FIGS. 1, 2, 4 and 5 may be applied to any feature surface configuration.

The tunable light source 102 may be configured to generate and to emit a light beam 118. In some embodiments, the tunable light source 102 may be a broadband light source that is tunable to multiple different wavelengths. For example, the tunable light source 102 may be tuned in a stepwise manner over a range of frequencies. In some embodiments, the tunable light source 102 may have a bandwidth that is between 300 nanometers (nm) and 1000 nm, between 1000 nm and 2000 nm, or some other range of wavelengths. For example, the tunable light source 102 may have a wavelength bandwidth that is between 650 nm and 950 nm. In some embodiments, the tuning step of the tunable light source 102 may be more or less than 1 nm. The tunable light source 102 may provide the light beam 118*a* at a first wavelength to the first beam splitter 104*a*.

The first beam splitter 104*a* may be optically coupled to the tunable light source 102, the sample 112, and the digital imager 116. The first beam splitter 104*a* may be configured to receive the light beam 118*a* and to direct or reflect the light beam 118*a* towards the sample 112. After being directed by the first beam splitter 104*a*, the light beam 118*a* may strike the reference plate 110 and raised surface feature 113*a* of the sample 112. Striking the reference plate 110 may generate a first light beam reflection 121 and striking the raised surface feature 113*a* of the sample 112 may generate a second light beam reflection 122 along the same path as the first light beam reflection 121. Alternately or additionally, a portion of the light beam 118*a* may traverse through the sample 112 to the surface 113*b* and strike the surface 113*b*. Striking the surface 113*b* may generate a third light beam reflection 123.

The first light beam reflection 121 and the second beam reflection 122 may be directed back toward the first beam splitter 104*a*. The third light beam reflection 123 may also be directed back toward the first beam splitter 104*a*. In these and other embodiments, the first and second light beam reflections 121, 122 and the third light beam reflection 123 may coherently add to one another to form a reflected light beam 119*a*. The tunable light source 102 may also be configured to generate a second light beam 118*b*, which may be directed onto the off-axis ring illuminator 108. The off-axis ring illuminator 108 may be configured to direct the second light beam 118*b* toward the reference plate 110 and the sample 112 at angles other than normal to the surface of the reference plate 110 and of the floor of the sample 112. Off-axis incident light may then be reflected/scattered by, for example, raised surface features on the sample as reflected beam 119*b*, as shown in FIG. 1.

The first beam splitter 104*a* may be configured to receive the reflected light beam 119*a* and the reflected off axis beam 119*b* and pass the reflected light beam 118*a* and the towards the digital imager 116 over interferometer channel 122*a*. In one embodiment, the reflected light beam 118*a* and the reflected off-axis beam 118*b* may hit the first beam splitter 104*a*, which then transmits a portion thereof though to the second beam splitter 104*b*. The second beam splitter 104*b* may be configured to reflects at least a portion of the reflected/scattered off-axis light beam 119*b* over an imaging channel 122*b* to the digital imager 114 and to transmit at least a portion of the reflected light beam 119*b* over an interferometer channel 122*a* to the digital imager 116. In the case in which the tunable light source 102 does not generate the second light beam 118*b* and the off-axis ring illuminator 108 is not present, the second beam splitter 104*b* may direct a portion of the reflected light beam 119*a* toward the digital imager 114 and may direct a portion of the reflected light beam 119*a* toward the digital imager 116. The second beam splitter 104*b* may be configured for 50% transmittance (toward digital imager 116) and 50% reflectivity (toward digital imager 114), or some other transmittance/reflectance ratio.

When the tunable light source 102 does generate the second light beam 118*b* (of a different wavelength/wavelengths than the first light beam 118*a*) for darkfield inspection and the off-axis ring illuminator 108 is present, the beam splitter 104*b* may include a dichroic mirror configured to primarily direct reflections from the first light beam 118 (having a first wavelength or band of wavelengths) to the digital imager 116 for interferometry and to primarily direct the reflections from the off-axis illumination light beam 118*b* (having a second, different wavelength or band of wavelengths) to the digital imager 114 for darkfield inspection. The digital imager 114 may be configured to receive primarily the off-axis reflected light beam 119*b* and to generate an image 124 based on an intensity of the reflected and/or scattered reflected off-axis light beam 119*b*. Similarly, the digital imager 116 may be configured to primarily receive the reflected light beam 119*a* and to generate an image 126 based on an intensity of the reflected light beam 119*a*. In some embodiments, the digital imagers 114 and 116 may be CMOS or CCD type imagers or other types of 1D- or 2D-array detectors. In these and other embodiments, the first and second digital imagers 114, 116 may include multiple pixel elements. The pixel elements may be configured such that, when illuminated, each provides information about the intensity of the illumination that is striking the pixel element. The digital imagers 114, 116 may compile the information from the pixels to form the images 124 and 126. The images 124 and 126 may thus include the intensity information for each of the pixels. These images 124, 126, when they include intensity information for each pixel, may be referred to as a grayscale digital images, with the constituent grey levels thereof corresponding to the different levels of intensity of the illumination. As shown, the digital imagers 114 and 116 may provide the images 124 and 126 to the processor system 128.

The processor system 128 may be electrically coupled to the digital imagers 114 and 116. In these and other embodiments, the processor system 128 may receive the images 124 and 126. Based on these images 124, 126, the processor system 128 may be configured to determine a distance between the raised surface feature 113a and the surface or floor 113b of the sample 112 and to produce a grayscale inspection image of the raised features on the surface of the sample 112. For example, the height of the raised surface features above the floor surface of the sample may be characterized by determining the distance between the reference plate 110 and the raised surface feature and the distance between the reference plate 110 and the floor surface of the semiconductor. Subtracting the former from the latter may yield the height of the raised surface feature(s) above the floor surface of the sample.

In some embodiments, the tunable light source 102 may be configured to generate the light beam 118a as a point light source with a small diameter beam. In these and other embodiments, the area of the sample 112 may be small and restricted to a particular location on the semiconductor device 130. In these and other embodiments, the distance between the raised surface feature 113a and the floor surface 113b may be determined for the particular location. Alternately or additionally, the tunable light source 102 may be configured to generate a wider light beam 118a to illuminate a larger field of view. In these and other embodiments, the area of the sample 112 being imaged may be larger. Indeed, the sample 112 of the substrate of the semiconductor device 130 that is illuminated may be several mm$^2$ or larger. In these and other embodiments, the images 124 and 126 may be formed based on the light beams 119a, 119b reflected or scattered by the topographical features or thickness of the sample 112. Thus, the images 124 and 126 may be an image of a portion or may cover an entire area of the sample 112, as opposed to a limited portion of the semiconductor device 130.

In another embodiment, the digital imagers 114 and 116 may be line scan cameras scanning across a larger illuminated area on raised surface feature 113a. By moving the semiconductor device 130 continuously across the field of view of the line scan camera, images 124 and 126 of an entire area of the surface may be gradually built and acquired. Alternatively still, the scan lines may be electrically steered to scan a surface or different adjacent scan lines may be activated in turn to scan the intended surface. Other embodiments may occur to those of skill in this art.

In these and other embodiments, particular pixels in the images 124 and 126 may correspond to particular locations in the area of the sample 112. The processor system 128 may be configured to determine a distance between the reference plate 110 and raised surface feature 113a and a distance between the reference plate 110 and the surface 113b of the sample 112 at multiple different locations within the area of the sample 112. In these and other embodiments, the processor system 128 may use illumination intensity information from particular pixels in the image 126 from the digital imager 116 on the interferometer channel 122a to determine the distance between the raised surface feature 113a and the floor surface 113b at particular locations of the sample 112 that correspond to the particular pixels in the image 126.

For example, a first pixel or a first group of pixels in the image 126 may correspond to a portion of the reflected light beam 119a that reflected from reference plate 110 and from a first location of the sample 112. A second pixel or a second group of pixels in the image 126 may correspond to a portion of the reflected light beam 119a that reflected from reference plate 110 and from a second location of the sample 112. Thus, the first pixel in the image 126 may have a grayscale value that is based on the first pixel or on the first group of pixels in the image 126, based on the intensity of the reflected light beam 119a that reflected from the first location of the sample 112. Furthermore, the second pixel in the image 126 may have a grayscale value that is based on the second pixel or on the second group of pixels in the image 126, based on the intensity of the reflected light beam 119a that reflected from the second location of the sample 112.

In these and other embodiments, the processor system 128 may be configured to determine the distance between the reference plate 110, the raised surface feature 113a and the floor surface 113b at the first location of the sample 112 based on the grayscale value(s) of the first pixel or the first group of pixels. The processor system 128 may also be configured to determine the distance between the reference plate 110, the raised surface feature 113a and the surface 113b at the second location of the sample 112 based on the grayscale value(s) of the second pixel or the second group of pixels. In these and other embodiments, the distance between the reference plate 110 and the raised surface feature 113a and the surface 113b at the first location and the second location may be different. In these and other embodiments, based on the different distances between the raised surface feature 113a and the floor surface 113b from the reference plate 110 at different locations of the sample 112, the processor system 128 may generate a topology/topography representation or a data set that is representative of the topology/topography of the area of the sample 112 that reflects the different distances between the raised surface feature 113a and the floor surface 113b at different locations of the sample 112.

The different intensities of the reflected light beam 119a received by different pixels of the digital imager 116 may result from different distances between the raised surface feature 113a and the floor surface 113b at different locations of the sample 112. The different distances between the raised surface feature 113a and the floor surface 113b at different locations of the sample 112 may result in different path length differences traversed by the first light beam reflection 121, the second light beam reflection 122 and the third light beam reflection 123 at different locations of the sample 112. The different path length differences may result in different phase differences between the reflections from at different locations. The different phase differences may result in a change in intensity when the second light beam reflection 122 and the third light beam reflection 123 add coherently with first beam reflection 121 from reference plate 110 that is coaxially-disposed with beam 121, to form the reflected light beam 119a. These beams may add coherently and generate an intensity (grayscale) pattern that is dependent on the phase difference between the first light beam reflection 121 and second beam reflection 122 and the phase difference between the first light beam reflection 121 and the third light beam reflection 123. For example, when the reflected light beams are in-phase, they interfere constructively (strengthening in intensity). Conversely, when the reflected beams are out-of-phase, they interfere destructively (weakening in intensity). These changes in intensity differences may be represented by the different grayscale values of the pixels in the image 126.

An example of the operation of the system 100a is now described. The tunable light source 102 may be configured to generate and to emit a number of different light beams 118a, 118b. Each of the multiple different light beams 118a, 118b may be generated at a different time and at a different wavelengths within predetermined wavelength ranges. In some embodiments, the different wavelengths of the different light beam 118a, 118b may result in different intensities of the reflected light beams 119a, 119b. The different intensities may be due to the different wavelengths of the different light beams 118a, 118b causing differences in the phase between the second light beam reflection 122 and the third light beam reflection 123 when added coherently to the first beam reflection 121 from the reference plate 110. For example, at a first wavelength of the light beam 118a, the coherently added first light beam reflection 121 from reference plate 110 and the second light beam reflection 122 and the coherently added first light beam reflection 121 from reference plate 110 and the third light beam reflection 123 may have a first phase difference at a second wavelength of the light beam 118a, the coherently added first light beam reflection 121 from reference plate 110 and the second light beam reflection 122 and the coherently added first light beam reflection 121 from reference plate 110 and the third light beam reflection 123 may have a second phase difference. The coherent addition with different phase differences may cause the reflected light beam 1198a to have different intensities. According to one embodiment, the number of the light beams emitted by the tunable light source 102 may be selected based on the distance between the surface of the reference plate 110 and the raised surface features of the sample 112. The determined distances between the reference plate 110 that faces the sample 112 and the raised surface features of the sample 112 may be based on a plurality of images generated based on the plurality of light beams.

Each of the different reflected light beams 119a may be used by the digital imager 116 to generate a different image 126. The processor system 128 may receive and store each of the different images generated by the digital imager 116. The processor system 128 may then use the different received images 126 to determine the distance between the raised surface feature 113a and the floor surface 113b.

In some embodiments, the processor system 128 may use the different intensities of the reflected beams 119a of different images to determine the distance between the raised surface feature 113a and the floor surface 113b. For example, in some embodiments, the processor system 128 may extract the grayscale value, representing an intensity value, for a corresponding (e.g., same) pixel of each image 126. The corresponding pixel in each image 126 may correspond with a particular pixel element in the digital imager 116. Thus, a particular pixel in each image 126 may be generated from the same pixel element in the digital imager 116. The grayscale values for the particular pixel in each image 126 may be plotted to form a fringe pattern with a sinusoidal waveform, a modulated sinusoidal waveform, or a complex waveform. For example, the intensity values of a particular pixel from different images may be plotted along the y-axis and the wavelength of the light beam 118a used to generate the different images may be plotted along the x-axis. In these and other embodiments, the distance between the reference plate 110 and the raised surface feature 113a and the distance between the reference plate and floor surface 113b at a particular point corresponding to the particular pixel may be determined based on the plotted fringe patterns.

For example, in some embodiments, the distance between the reference plate 110 and the raised surface feature 113a and the distance between the reference plate 110 and floor surface 113b at a particular point corresponding to a particular pixel may be determined based on a frequency domain transformation, such as a Fast Fourier Transform (FFT), a Discrete Fourier Transform (DFT), a Discrete Cosine Transform (DCT) or Hilbert Transform of the fringe patterns. Other transformations may be utilized. Alternately or additionally, in some embodiments, these distances at a particular point corresponding to a particular pixel may be determined based on a comparison between a model-based predicted fringe pattern and the determined pixel intensity fringe patterns from the images 126. Each of the model-based predicted fringe patterns may be constructed for a different distance, based on previous actual results or theoretical mathematical expressions. For example, a relationship between a phase difference and an intensity of reflected light beam 119a may be determined or estimated using the following mathematical expression:

$$I_0 = I_1 + I_2 + 2\sqrt{I_1 I_2} \cos\left(\frac{2\pi d}{\lambda}\right)$$

In the above expression, "$I_1$" refers to the intensity of the first light beam reflection 121 from reference plate 110, "$I_2$" may refer to the intensity of the second light beam reflection 122 from the raised surface feature 113a, "d" may refer to the optical distance between the reference plate 110 and the raised surface feature 113a, "$\lambda$" refers to the wavelength of the light beam 118a, and "$I_0$" may refer to the measured intensity of the reflected light beam 119a. In the above expression, "$I_2$" may also refer to the intensity of the third light beam reflection 123 from the floor surface 113b, "d" may refer to the optical distance between the reference plate 110 and the floor surface 113b, "$\lambda$" may refer to the wavelength of the light beam 118a, and "$I_0$" may refer to the intensity of the reflected light beam 119a by coherently adding the first light beam reflection 121 and the third light beam reflection 123. Based on the above expression, model based predicted fringe patterns may be created for determining the optical height of the feature on sample 130.

In these and other embodiments, the fringe pattern determined from processor system 128 may be compared to each or some of the model-based predicted fringe patterns. The model-based predicted fringe patterns closest to the determined fringe pattern may be selected and the distance for which the selected model based predicted fringe was constructed may be the determined distance between the raised surface feature 113a and the floor surface 113b.

In some embodiments, the processor system 128 may perform an analogous analysis for each pixel of the different images 126. Using the distance information from each pixel, the processor system 128 may determine the topology of the area of the sample 112 illuminated by the light beam 118a.

In some embodiments, a number of different light beams 118a with different wavelengths used by the system 100a and thus a number of different images generated by the digital imager 116 may be selected based on an estimated distance between the raised surface feature 113a and the floor surface 113b. When the optical distance between the raised surface feature 113a and the floor surface 113b is small, such as below 1 micrometer (µm), the number of different light beams 118a may be increased as compared to when the optical distance between the raised surface feature 113a and the floor surface 113b is larger, such as above 1 µm. In these and other embodiments, an inverse relationship between the distance to be determined between the two surfaces and the number of different light beams 118a may exist. As such, a bandwidth of the wavelengths of the different light beams 118a may have an inverse relationship with the distance to be determined between the raised surface feature 113a and the floor or reference surface 113b, as shorter distances may call for an increased number of different wavelengths to correctly characterize the small height of the raised surface features of the sample 112, and vice-versa.

The relationship between the distance to be determined between the raised surface feature 113a and the floor surface 113b and the difference in the wavelength between respective different light beams 118a (the wavelength step size) may also have an inverse relationship. Thus, for a small size distance between the raised surface feature 113a and the floor surface 113b, the wavelength step-size may be a first wavelength step-size. For a medium size distance between the raised surface feature 113a and the floor surface 113b, the wavelength step-size may be a second wavelength step-size and for a large size distance between the raised surface feature 113a and the floor surface 113b, the wavelength step-size may be a third wavelength step-size. In these and other embodiments, the third wavelength step-size may be smaller than the first and second wavelength step-size and the second wavelength step-size may be smaller than the first wavelength step-size. Additionally, the bandwidth of each light beam 118a corresponding to each wavelength step may get smaller as the distance between the raised surface feature 113a and the floor surface 113b increases.

In some embodiments, the semiconductor device 130 may be repositioned with respect to the system 100a. For example, the semiconductor device 130 may be moved or the system 100a may be moved. Both may be moved relative to one another. In these and other embodiments, the system 100a may be configured to determine a distance between the raised surface feature 113a and the floor surface 113b from a second sample of the semiconductor device 130. The second sample of the semiconductor device 130 may have been a portion of the semiconductor device 130 that was previously unilluminated by the light beam(s) 118a, 118b or for which reflections from second sample did not reach the digital imagers 114 and 116. In these and other embodiments, the semiconductor device 130 may be repositioned such that entire surface of the semiconductor device 130 may be a sample for which the distance between the raised surface feature 113a and the floor surface 113b is determined or image of the sample surface is captured. In these and other embodiments, the system 100a may be repositioned such that entire surface of the semiconductor device 130 may be a sample for which the distance between the raised surface feature 113a and the floor surface 113b is determined or image of the sample surface is captured.

Figure 2:
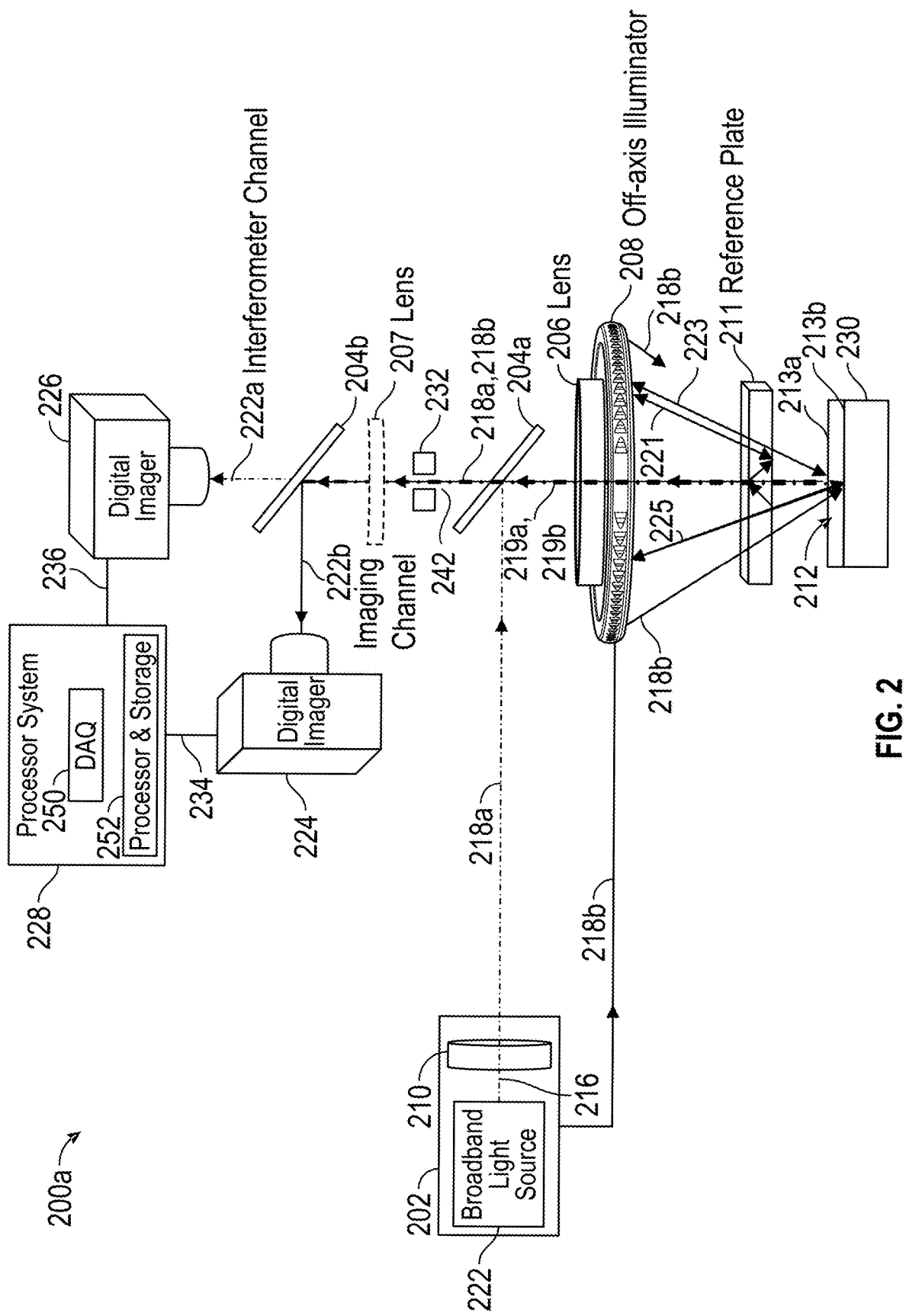
FIG. 2 illustrates another example interferometer system according to an embodiment.

Modifications, additions, or omissions may be made to the system 100a. For example, in some embodiments, the system 100a may include additional optical components between the first and second beam splitters 104a, 104b and the digital imagers 114 and 116, as illustrated in FIG. 2.

The system 100a as shown and described herein differs from previous distance measurement concepts. Advantageously, according to embodiments, because the reference plate 110 and both the raised surface feature 113a and the surface 113b are illuminated by the same light beam 118a, any vibrations of the semiconductor device 130 affects all beam reflected from sample 130 substantially equally and at substantially the same time such that the system 100a may compensate for the vibrations.

In some embodiments, an interferometer system may include multiple tunable light sources, multiple beam splitters, and multiple digital imagers. In some embodiments, an interferometer system may include single tunable light sources, multiple beam splitters, and digital imagers. In these and other embodiments, a tunable light source, a beam splitter, and a digital imager may be referred to in this disclosure as interferometer sub-systems.

FIG. 1A illustrates an embodiment of an inspection system 100a (the "system 100a"). In general, the system 100a may be configured to image a raised surface feature 113a of a sample 112 that is part of a semiconductor device 130 using light beams 118a and 118b. To image the surface, the system 100a may include a tunable light source 102, beam splitters 104a and 104b, lens system 106, a digital imager 114, and a processor system 128.

The system 100a may be implemented to generate an image of the raised surface features 113a and floor surface 113b by illuminating the surfaces 113a, 113b with light beams 118a and 118b. The two beams may be generated simultaneously or may be generated one after another.

Figure 3:
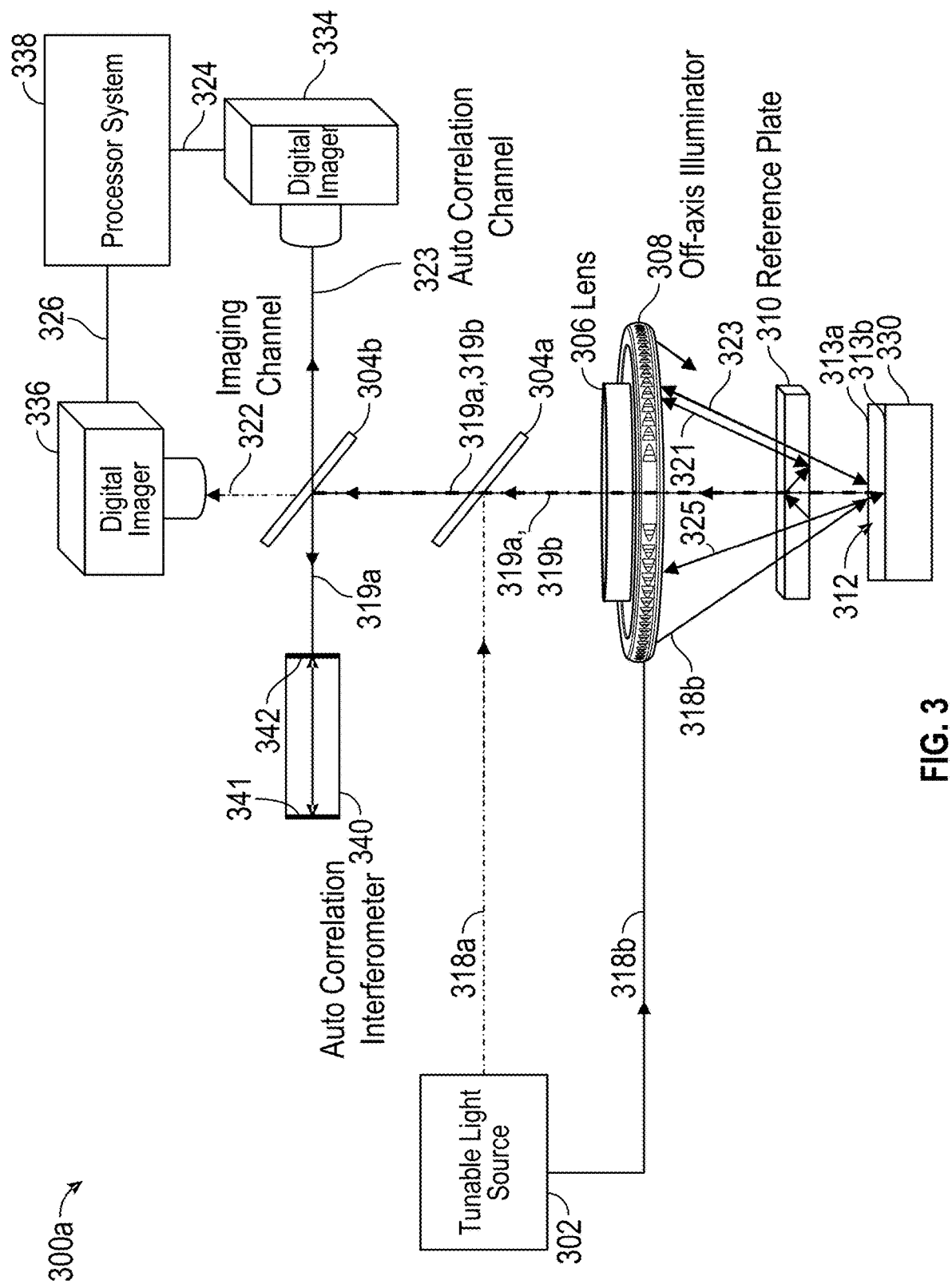
FIG. 3 illustrates an example interferometer that includes auto correlation interferometry according to an embodiment.

In some embodiments, the imaging system 100a may include light beam 118b, an off-axis ring illuminator 108, a second beam splitter 104b and a digital imager 114. This embodiment enables generation of dark field images of the sample surface 113a. The off-axis ring illuminator 108, as shown in FIG. 1, transmits the light beam 118b toward the sample 112 at an angle (other than normal) relative to the reference plate 110 and the sample 112, as opposed to the normal incidence light beam 118a, which is directed toward the reference plate 110 and the sample 112 perpendicularly, or substantially perpendicularly, as shown in FIGS. 1A, 2 and 3.

In some embodiments, the imaging system 100a may include light beam 118a, first and second beam splitters 104a and 104b, imaging lens system 106 and digital imager 114. This embodiment enables generation of brightfield field images of the surface of the sample surface.

In other embodiments, the imaging system 100a may include both light beams 118a and 118b, both first and second beam splitters 104a and 104b, and a digital imager 114. This embodiment enables generation of brightfield field images of the surface of the sample.

In still further embodiments, the imaging system 100a may include both light beams 118a and 118b, both first and second beam splitters 104a and 104b, and both digital imagers 114 and 116. This embodiment enables generation of brightfield field images of the surface of the sample.

The system 100a may be implemented to generate a fluorescence image of the surface 113a. In some embodiment, a fluorescence image of the surface 113a is generated by illuminating the surface 113a with light beams 118a and 118b composed of one or more shorter wavelengths from the tunable source 102. This shorter wavelength may excite materials of surface 113a to fluoresce at correspondingly longer wavelengths. The fluorescence emission from surface 113a may be imaged by both digital imagers 114 and 116.

In some embodiment, a fluorescence image and bright field/dark field image of the surface 113a may be generated by illuminating the surface of the sample with light beams 118a and 118b composed of shorter wavelengths from the tunable source 102. This shorter wavelength may excite materials of surface to fluoresce at correspondingly longer wavelengths. The fluorescence emission along with reflected and scattered light from the surface of the sample may be imaged by both digital imagers 114 and 116, thereby enabling darkfield inspection, brightfield inspection and fluorescence inspection to occur simultaneously in a single device. For example, the tunable light source 102 may be configured to generate a first light beam, 118a having a wavelength of, in this example, 520 nm. Interaction of this wavelength of light with the sample 112 and the raised features thereof causes emission of fluorescence light at a comparatively longer wavelength, such as 620 nm in this example. The 620 nm light, as well as that portion of the 520 nm light that did not cause fluorescence, are directed back through the lens system 106, through the first beam splitter 104a toward the second beam splitter 104b. In this embodiment, the second beam splitter 104b may be a dichroic mirror configured to primarily direct the fluorescence signal at 520 nm to the imaging channel 122b to imager 114 for fluorescence imaging and inspection and to primarily direct the reflected 520 nm (with phase change) light beam to digital imager 116 for brightfield inspection, or vice versa. A third digital imager and a third dichroic mirror may be added to primarily direct reflections from the second light beam 118b to third digital imager for darkfield inspection of the surface features of the sample 112, to thereby enable brightfield, darkfield and fluorescence inspection simultaneously, in one device.

The system 100a may be implemented with respect to any suitable application where a surface inspection may be required. For example, in some embodiments, the raised surface feature 113a may be or comprise a bump feature of a semiconductor advanced packaging device 130. In these and other embodiments, the semiconductor device 130 may be any circuit, chip, device, or 3D feature that is fabricated on a silicon wafer. The semiconductor device 130 may include multiple layers of the same or different materials between the raised surface feature 113a and the surface 113b. Alternately or additionally, the raised surface feature 113a may be a MEMS structure and the surface 113b may be a surface on which the MEMS structure is built.

Alternately or additionally, the raised surface feature 113a may be any type of interconnect feature used in 3D packaging and the surface 113b may be the corresponding surface from which the interconnect features protrude. An example of a protruding feature and a reference surface is described with respect to FIG. 4. Alternately or additionally, the raised surface feature 113a may be an embedded surface within a semiconductor device or some other device and the reference surface may be a top surface as shown in FIG. 5. Although FIGS. 1, 2, 4 and 5 illustrate certain surface feature configurations, the principles and operation of the systems described in FIGS. 1, 2, 4 and 5 may be applied to any surface feature configuration.

The digital imagers 114 and 116 may be configured to receive the reflected light beam 119a, 119b and to correspondingly generate respective images 124, 126 based on an intensity of the respective reflected light beams 119a, 119b. In some embodiments, the digital imagers 114, 116 may be CMOS or CCD type imager or other types of 2D- and 1D-array detectors. In these and other embodiments, these digital imagers may include multiple pixel elements. The pixel elements may be configured such that, when illuminated, each pixel element provides information about the intensity of the illumination that is striking the pixel element. The digital imagers 114, 116 may compile the information from the pixel elements to form the images 124, 126, respectively. These images may thus include the intensity information for each of the pixel elements. The images 124, 126, when including the intensity information for each pixel element, may be referred to as a grayscale digital images. The digital imager 114 may provide the image 124 to the processor system 128 and digital imager 116 may provide the image 126 to the processor system 128.

FIG. 1B illustrates multiple interferometer sub-systems 160a and 160b in an exemplary interferometer system 100b, arranged according to at least some embodiments described in this disclosure. Each of the sub-systems 160a and 160b may include a tunable light source, one or more beam splitters, lens system and digital imagers analogous to the tunable light source 102, the first and second beam splitters 104, lens system 106 and the digital imagers 114, 116 of FIG. 1A. Each of the sub-systems 160a and 160b may be configured to illuminate a different portion of a semiconductor device or other sample 180. Images generated by each of the sub-systems 160a and 160b may be provided to a processor system 190 that may be analogous to the processor system 128 of FIG. 1A. The processor system 190 may be configured to determine height of the surface features of the semiconductor device 180 based on the images from the sub-systems 160a and 160b. The processor system 190 may be configured to generate an image of the surface of sample 180. Thus, in these and other embodiments, multiple samples of the semiconductor device 130 may be processed at the same time, in parallel. By processing multiple samples at the same time, a height of the raised surface features across the semiconductor device 180 may be determined in less time than when portions of the semiconductor device 180 are processed sequentially or one at a time. Similarly, by processing multiple samples simultaneously, images across the semiconductor device 160 may be generated in less time than when successive portions of the semiconductor device 180 are processed sequentially, one at a time.

Modifications, additions, or omissions may be made to the system 100b without departing from the scope of the present disclosure. For example, each of the sub-systems 160a and 160b may include a processor system. In these and other embodiments, one of the processor systems may compile information for the entire semiconductor device 180 from other of the processor systems.

FIG. 2 illustrates another example interferometer system 200a (the "system 200a"), according to at least some embodiments described in this disclosure. The system 200a may be configured, using light beams 218a, 218b, to determine a height of a raised surface feature 213a from floor surface 213b on a sample 212 that is part of a semiconductor device 230. To determine the distance or capture an image, the system 200a may include a tunable light source 202, first and second beam splitters 204a, 204b, a first lens system 206, digital imagers 224 and 226, and a processor system 228.

The system 200a may be implemented with respect to any suitable application where a distance may be measured. For example, in some embodiments, the raised surface feature may be a top surface of a semiconductor device 230 and the floor surface 213b may be a top surface of a silicon substrate wafer that forms a substrate of the semiconductor device 230 from which the raised surface features rise.

The tunable light source 202 may be configured to generate and to emit a light beam 218a and light beam 218b. The tunable light source 202 may be analogous to the tunable light source 102 of FIG. 1A and may be configured to provide light beams 218a, 218b at a particular wavelength or at several different wavelengths within a range of wavelengths over a period of time. As illustrated in FIG. 2, in some embodiments, the tunable light source 202 may include a broadband light source 222 and a tunable filter 210 that are co-axially disposed and optically coupled. The broadband light source 222 may be configured to emit a broadband light beam 216 that includes wavelengths of light that may be used by the system 200a. In some embodiments, the broadband light source 222 may be a light source such as a white light or a super luminescent diode (SLED). In some embodiments, the broadband light source 222 may be configured to provide the broadband light beam 216 with a Gaussian power spectrum.

The tunable filter 210 may be configured to filter the broadband light beam 216 to generate the light beam 218a at a particular wavelength. In some embodiments, the tunable filter 210 may be tuned, such that the tunable filter 210 may filter different wavelengths of light to generate the light beam 218a at multiple different wavelengths of light.

An off-axis ring illuminator 208 may be provided and receive light beam 218b also generated by broadband light source 222 to illuminate the sample 212 with off-axis (e.g., not normal incidence) light beam 218b. In some embodiments, the first beam splitter 204a may be configured to receive the light beam 218a and to direct the light beam 218a, towards the sample 212 via lens system 206. The first beam splitter 204a may be further configured to reflect and transmit a portion of the light beam 218a, 218b. For example, the first and second beam splitters 204a, 204b may reflect 50 percent and transmit 50 percent of the light beams 218a, 218b. Alternately or additionally, the beam splitters 204 may reflect a different percent of the light beams 218a, 218b (such as to reflect all or substantially all of the first light beam 218a). In these and other embodiments, the reflected portion of the light beam 218a reflected by first beam splitter 204a may be directed to the sample 212.

The sample 212 may be analogous to the sample 112 in FIG. 1A. In these and other embodiments, the light beams 218a, 218b may be reflected and/or scattered by the raised surface feature 213a and the floor surface 213b of the sample 212 to form the reflected light beams 218a, 218b. The reflected light beams 218a, 218b may be received by the first and second beam splitters 204a, 204b via first lens system 206. The first and second beam splitters 204a, 204b may reflect a portion and transmit a portion of the reflected light beams 218a, 218b.

The first lens system 206 may be configured to receive the reflected light beams 218a and 218b from sample 212 and to focus images of the sample on the digital imagers 224, 226. A second lens system 207 may be provided between the first and second beam splitters 204a, 204b. The first lens system 206 and the second lens system 207, if present, may pass and focus the reflected light beam 218a, 218b toward the digital imagers 224 and 226. The digital imagers 224, 226 may include an image sensor. The image sensor may include a CMOS image sensor, a CCD image sensor, or other types of 1D- and 2D-array detectors. The digital imagers 224 and 226 may generate images 234 and 236 based on the reflected and scattered light beams 218a, 218b and pass the images to the processor system 228.

The processor system 228 may be analogous to and configured to operate in a similar manner as does the processor system 128 of FIG. 1A. The processor system 228 may be implemented by any suitable mechanism, such as a program, software, function, library, software as a service, analog, or digital circuitry, or any combination thereof. In some embodiments, such as illustrated in FIG. 2, the processor system 228 may include a data acquisition module 250 and a processor and storage module 252. The processor and storage module 252 may include, for example, a microprocessor, microcontroller, digital signal processor (DSP), application-specific integrated circuit (ASIC), a Field-Programmable Gate Array (FPGA), or any other digital or analog circuitry configured to interpret and/or to execute program instructions and/or to process data. In some embodiments, the processor of the processor and storage module 252 may interpret and/or execute program instructions and/or process data stored in the memory of the processor and storage module 252. For example, the images 234 and 236 generated by the digital imagers 224 and 226 may be stored in the memory of the processor and storage module 252. The processor of the processor and storage module 252 may execute instructions to perform the operations with respect to the image 234 and 236 to generate image of sample 212 and to determine the distance between the raised surface feature 213a and the floor surface 213b and/or thickness of the sample 212

The memory in the processor and storage module 252 may include any suitable computer-readable media configured to retain program instructions and/or data, such as the images 234 and 236, for a period of time. By way of example, and not limitation, such computer-readable media may include tangible and/or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable media. Computer-executable instructions may include, for example, instructions and data that cause a general-purpose computer, special-purpose computer, or special-purpose processing device to perform a certain function or group of functions. Modifications, additions, or omissions may be made to the system 200A without departing from the scope of the present disclosure.

The embodiment of the interferometer system 200a of FIG. 2 may include an adjustable aperture device 232, which may be adjusted, according to one embodiment, based upon the lateral resolution of the interferometer system 200a.

The adjustable aperture device 232 may be configured to adjust a size of an aperture 242 through which the reflected light beams 219a, 219b may travel. In some embodiments, the adjustable aperture device 232 may be positioned between the first and second beam splitters 204a and 204b. The adjustable aperture device 232 may also be positioned between the first lens system 206 and the first beam splitter 204a. Alternately or additionally, as shown in FIG. 2, the adjustable aperture device 232 may be positioned between the first lens system 206 and tube lenses of the digital imagers 224 and 226. In some embodiments, the aperture 242 of the adjustable aperture device 232 may result in an adjustable system pupil plane. A position of the adjustable system pupil plane may be based on a position of the adjustable aperture device 232 (and therefore the size of aperture 242) in the imaging path made up of lens system 206, aperture 242, and the digital imagers 224, 226. In some embodiments, a position of the adjustable system pupil plane, and thus the position of the adjustable aperture device 232, may be determined based on whether the adjustable system pupil plane is configured to control spatial resolution or field of view of the digital imagers 224, 226.

In some embodiments, the size of the aperture 242 may be adjusted based on a feature size in an area of the sample 212. In some embodiments, the size of the aperture 242 may be adjusted based on a required spatial resolution of the area of the sample 212 that is being imaged by the digital imagers 224, 226. In these and other embodiments, adjusting the size of the aperture 242 may affect one or more of: a light beam angle or a numerical aperture (NA) of the reflected light beam 219a or 219b on the first lens system 206; relay of the reflected light beam 219a, 219b; sharpness of the images 234, 236 generated by the digital imagers 224, 226; depth of focus, the field of view and spatial resolution on the digital images, among others.

In some embodiments, the system 200a may be configured before determining a distance between the raised surface feature 213a and the surface 213b. In these and other embodiments, the size of the aperture 242 may be selected. The size of the aperture 242 may be selected based on an area of the sample 212. The area of the sample 212 may be an area in a plane that includes at least a portion of a raised surface feature 213a. In these and other embodiments, the size of the aperture 242 may be based on required lateral resolution, i.e., the smallest size of a feature to be measured within or on the sample 212 of the semiconductor device 230. In these and other embodiments, when the lateral size of the feature is small, the size of the aperture 242 is correspondingly larger. When the lateral size of the feature is larger, the size of the aperture 242 is correspondingly smaller.

In some embodiments, configuring the system 200a may include setting an exposure time and gain of the digital imagers 224 and 226. In these other embodiments, an initial exposure time and gain may be selected for the digital images 234, 236. The initial exposure time and gain may be selected based on the area and the reflectivity of the sample 212. In one embodiment, the exposure time, and the signal to noise of the digital imagers 224, 226 may be dependent on digital imagers' read-out time, the number of wavelengths in the plurality of light beams and the reflectivity of the sample 212.

After selecting the initial exposure time and gain, the light beams 218a, 218b may illuminate the sample 212 and images 234, 236 may be captured by the digital imagers 224 and 226 from the reflected light beams 219a, 29 1b. The images 234, 236 may be processed to determine if any pixels thereof saturated after having been exposed to the reflected light beam 219a, 219b. Saturation may be determined when there is flat line of a grayscale value across multiple adjacent pixels in the images 234, 236. When it is determined that some of the pixels of the images 234, 236 saturated, the gain and/or the exposure time may be reduced. For example, the gain may be reduced by ten percent. The process of checking for saturation by the processor system 228 may be iteratively carried out and the gain and the exposure time successively reduced until the little or no saturation of pixels occurs at a particular wavelength of the light beams 218a, 218b. In these and other embodiments, the particular wavelength selected may be the wavelength with the highest power. Using the wavelength with the highest power during configuration may reduce the likelihood of saturation of pixels with wavelengths of lower power during operation of the system 200a.

In some embodiments, configuring the system 200a may include selecting a range of wavelengths for the light beams 218a, 218b and the wavelength step size between light beams 218a, 218b. In some embodiments, the range of wavelengths for the light beams 218a, 218b and the wavelength step size may be selected based on a shortest distance between the raised surface feature 213a and the floor surface 213b over the area of the sample 212. In these and other embodiments, an approximate or estimated shortest distance may be selected based on the known design and construction of the semiconductor device 230. Indeed, the intended, designed-for smallest and largest features of the semiconductor device 230 may be known a priori. In these and other embodiments, the range of wavelengths for the light beams 218a, 218b and the wavelength step size may then be selected based on the shortest anticipated feature size. As discussed previously, the range of wavelengths for the light beams 218a, 218b and the wavelength step size may have an inverse relationship with respect to distance between the raised surface feature 213a and the floor surface 213b.

Modifications, additions, or omissions may be made to the system 200a without departing from the scope of the present disclosure. For example, in some embodiments, the adjustable aperture device 232 may be located between the first lens system 206 and the first beam splitter 204a or between the first and second beam splitters 204a, 204b, as shown in FIG. 2.

Figure 4:
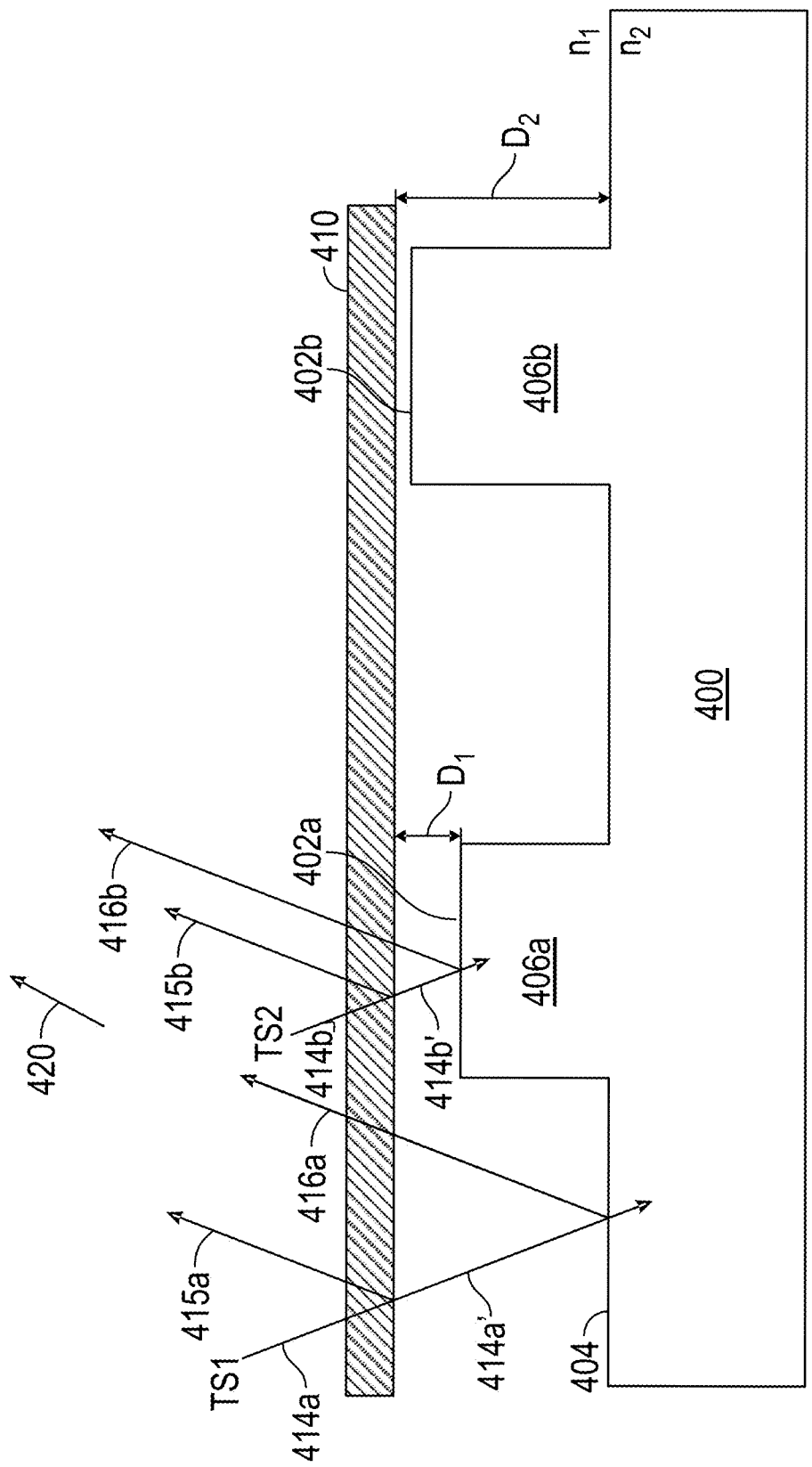
FIG. 4 illustrates an example of beam reflection off an example semiconductor device according to an embodiment.
Figure 5:
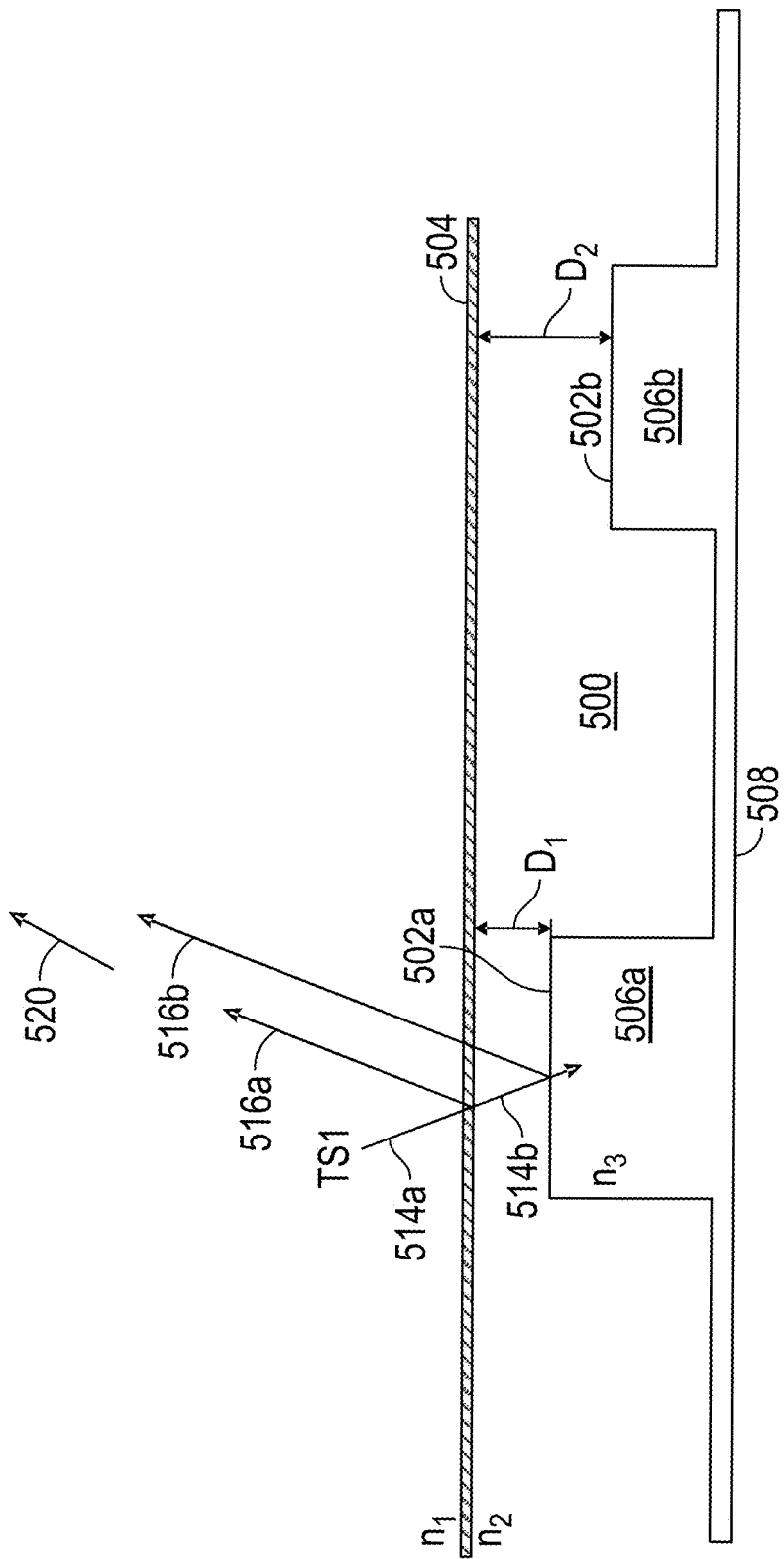
FIG. 5 illustrates an example of beam reflection off another example semiconductor device according to an embodiment.

FIG. 4 illustrates an example of beam reflection off another exemplary semiconductor device 400, arranged in accordance with at least some embodiments described in this disclosure. As shown therein, reference plate 410 is positioned facing a distance away from and above the semiconductor device 400. According to embodiments, the reference plate 410 may be coated for partial reflectance and partial transmissivity. The semiconductor device 400 may include a first raised portion 406a and a second raised portion 406b, both of which extend above a sample floor surface 404 of the semiconductor device 400. A top surface of the first raised portion 406a may be a first raised surface feature 402a of the semiconductor device 400. A top surface of the second raised portion 406b may be a second raised surface feature 402b of the semiconductor device 400. Using light beams and an interferometer system described in some embodiments in the present disclosure, a distance D1 between the reference plate 410 and the first feature surface 402a may be determined. Alternately or additionally, a distance D2 between the reference plate 410 and the surface 404 may be determined. From these two distance measurements, the height of the raised surface feature 406a away from surface 404 may be determined. In some embodiments, the floor surface 404 may be at varying heights with respect to the first and second raised portions 406a and 406b. For example, the floor surface 404 to the left of the first raised portion 406a may be higher than the floor surface 404 to the right of the second raised portion 406b. Therefore, the height of any raised surface feature of the semiconductor device 400 may be characterized by its height above a stated reference surface. Indeed, that reference surface may be the underside of the reference plate that faces the semiconductor device 400 as shown with reference to D1. Alternatively, that reference surface may be a predetermined portion of the sample floor surface 404, as shown with reference to D2.

FIG. 4 illustrates a light beam from a light source TS1. The light beam from TS1 includes a first light beam portion 414a that is incident upon the reference plate surface 410, thereby generating first reflected beam 415a and a second light beam portion 414a' that strikes the surface 404. A part of the second light beam portion 414a' may be reflected off of the surface 404 and generate a second reflected beam 416a. The rest of the first light beam portion 414a' may pass through the semiconductor device 400 and/or incur additional reflections, scattering or refractions.

A part of the second light beam portion 414*b* from a light source TS2 may be reflected off of the reference plate to generate reflected beam 415*b* and a part of the second light beam portion 414*b* may strike the raised surface feature 402*a* and generate a second reflected beam 416*b*. A remaining portion of the second light beam portion 414*b*' may pass through the semiconductor device 400 and/or incur additional reflections, scattering or refractions.

The first and second reflected beams 415*a*, 416*a* and 415*b*, 416*b* may coherently add to form a combined reflected beam 420. In some embodiments, the reflected beam 420 may pass through the first lens system 206, the aperture 242 as illustrated and described with respect to FIG. 2 and be provided to the digital imagers 224, 226. Images (such as shown at 234, 236 in FIG. 2, for example) may be formed using at least the intensity of the reflected beam 420. The images thus generated may be part of a collection of images that may be stored and used to determine the distances D1 and D2.

In some embodiments, the light source TS1 may also illuminate the second raised portion 406*b*. In a similar manner as described with respect to the first raised portion 406*a*, a reflected beam may be formed and captured to form an image or images. The image may be part of a collection of images that may be used to determine the distances D1 and D2.

FIG. 5 illustrates an illustrative example of beam reflection off another exemplary semiconductor device 500, arranged in accordance with at least some embodiments described in this disclosure. The semiconductor device 500 may include a first raised portion 506*a* and a second raised portion 506*b* that extend away from a first surface 508 of the semiconductor device 500 toward a reference plate 504. A top surface of the first raised portion 506*a* may be a first raised surface feature 502*a* of the semiconductor device 500. A top surface of the second raised portion 506*b* may be a second raised surface feature 502*b* of the semiconductor device 500. Using light beams and an interferometer system described in some embodiments in the present disclosure, a distance D1 between the reference plate 504 and the first feature surface 502*a* may be determined. The distance D1 may represent a distance that the first feature surface 502*a* is below (at least in the orientation shown in FIG. 5) the reference plate 504. Alternately or additionally, a distance D2 between the reference plate 504 and the second raised surface feature 502*b* may be determined. In some embodiments, the reference plate 504 may be at varying heights with respect to the first and second raised portions 506*a* and 506*b* or with respect to the reference plate 504. In some embodiments the reference plate may not be part of the semiconductor device 500 or part of substrate 508.

FIG. 5 illustrates a light beam 514*a* generated from a light source TS1. The light beam 514*a* may strike the reference plate 504. A part of the light beam 514*a* may be reflected off the reference plate 504 and generate a first reflected beam 516*a*. The rest (or some remaining portion) of the light beam 514*a* may pass through the reference plate 504 and generate a refracted beam 514*b*. The refracted beam 514*b* may hit the first raised surface feature 502*a* of the first raised portion 506*a* and part of the refracted beam 514*b* may be reflected off the first features surface 502*a* to generate a second reflected beam 516*b*. The second reflected beam 516*b* may pass through the reference plate 504, although some additional reflections, refractions and scattering may also occur.

The first and second reflected beams 516*a* and 516*b* may coherently add to form a reflected beam 520. In some embodiments, the reflected beam 520 may pass through the first lens system 206, and the aperture 242, as illustrated and described with respect to FIG. 2 and be provided to the digital imagers 224, 226. Images (such as shown at 234, 236, for example) may be formed using at least the intensity of the reflected beam 520. The thus formed images may be part of a collection of images that may be used to determine the distance D1.

In some embodiments, the light source TS1 may also illuminate the second raised portion 506*b*. In a similar manner as described with respect to the first raised portion 506*a*, a reflected beam may be formed and captured to form an image or images. These images may be part of a collection of images that may be used to determine the distance D2.

One skilled in the art will appreciate that, for this and other processes and methods disclosed in this disclosure, the functions performed in the processes and methods may be implemented in differing order. Furthermore, the outlined steps and operations are only provided as examples, and some of the steps and operations may be optional, combined into fewer steps and operations, or expanded into additional steps and operations within the scope of the disclosed embodiments.

For example, in some embodiments, the implementation method may include adjusting a size of an aperture (see reference 242 in FIG. 2, for example), through which the reflected light beam passes, based on an area of a feature along the feature surface for which the distance between the reference plate and the feature surface is determined.

In these and other embodiments, a wavelength difference between the first wavelength and the second wavelength emitted simultaneously or over time may be selected based on the height or depth of the raised surface feature on the sample surface relative to the reference plate 110 or the floor of the sample 112. The pathlength inside the reference plate 110 is not significant and both facing surfaces of the reference plate contribute to that pathlength. In these and other embodiments, determining the height or depth of raised surface features on sample surface based on wavelength dependent images may include constructing a waveform or fringe pattern based on wavelength dependent intensity values and performing a frequency domain transformation such as a Fast Fourier Transform or Hilbert Transform on the waveform or fringe pattern. In these and other embodiments, the distance between the different surfaces at a first location on the sample may be determined based on a first intensity value at a first pixel location in the first image and a second intensity value at the first pixel location in the second image. In these and other embodiments, the distance may be a first distance and the implementation method may further include determining a second distance between the reference plate and the raised surface feature based on the first image and the second image at a second location on the sample. The second distance may be determined based on a first intensity value at a second pixel location in the first image and a second intensity value at the second pixel location in the second image.

In these and other embodiments, the imaging lens system 106 shown in FIG. 1A or the imaging lens system 206 in FIG. 2 is common for both the imaging channel 122*b* and the interferometer channel 122*a*. Alternately or additionally, each channel 122*a*, 122*b* or 222*a*, 222*b* may have its own, independent imaging lens system.

FIG. 3 illustrates another embodiment of an interferometer system 300*a* (the "system 300*a*"). The system 300*a* may be configured to determine, using light beams, a height of a raised surface feature 313*a* away from a floor or reference surface 313b of a sample 312 that is part of a semiconductor device 330. To determine the distance or to capture an image, the system 300a may include a tunable light source 302, first and second beam splitters 304a, 304b, a first lens system 306, an auto-correlation interferometer 340, digital imagers 334 and 336, and a processor system 338.

The system 300a may be implemented with respect to any suitable application where a distance may be measured. For example, in some embodiments, the raised surface feature 313a may be a top surface of a semiconductor device 330 and the floor surface 313b may be a top surface of a silicon substrate wafer that forms a substrate of the semiconductor device 330.

The tunable light source 302 may be configured to generate and to emit light beams 318a, 318b. The tunable light source 302 may be analogous to the tunable light source 102 of FIG. 1A and may be configured to provide a light beam 318a at a particular wavelength. An off-axis ring illuminator 308 may be provided and receive light beam 318b to illuminate the sample 312 with off-axis light beam 318b. As illustrated in FIG. 2, in system 300a and in some embodiments, the tunable light source 302 may include a broadband light source and a tunable filter that are co-axially-disposed and optically coupled. The broadband light source may be configured to emit a broadband light beam that includes wavelengths of light that may be used by the system 300a. In some embodiments, the broadband light source may be a light source such as a white light or a super luminescent diode (SLED). In some embodiments, the broadband light source may be configured to provide the broadband light beam with a Gaussian power spectrum.

The tunable light source 302 may be configured to generate the light beam 318a at a particular wavelength. In some embodiments, the tunable light source 302 may be tuned, to generate different wavelengths of light to generate the light beam 318a at multiple different wavelengths of light within a predetermined range of wavelengths. The tunable light source 302 also may be configured to generate the light beam 318b at a particular wavelength. In some embodiments, the tunable light source 302 may be tuned to generate different wavelengths of light to generate the light beam 318b at multiple different wavelengths of light within a predetermined range of wavelengths. These different wavelengths may be provided to the off-axis ring illuminator 308 over a period of time, to enable, among other applications, dark-field images of the sample 312.

In some embodiments, at least the first and beam splitters 304a may be configured to receive the light beam 318a and to direct the light beam 318a towards the sample 312 via first lens system 306. The first and second beam splitters 304a, 304b may be configured to reflect and transmit a portion of the light beam 318a, 318b. For example, the first and second beam splitters 304a, 304b may reflect 50 percent and transmit 50 percent of the light beam 318a. Alternately or additionally, the first and second beam splitters 304a, 304b may reflect a different percentage of the light beam 318a, 318b incident thereon. In these and other embodiments, the portion of the light beam 318a reflected by the first beam splitter 304a may be directed to the sample 312.

The sample 312 may be analogous to the sample 112 in FIG. 1A. In these and other embodiments, the light beams 318a, 318b may be reflected by the reference plate 310, the raised surface feature 313a and the floor surface 313b of the sample 312 to form the reflected light beams 319a, 319b. According to embodiments, the reference plate 310 may be coated for partial reflectance and partial transmittance. The reflected light beams 319a 319b, reflected and/or scattered by sample 330, may be received by the first and second beam splitters 304a and 304b via first lens system 306. A second lens may be provided between the beam splitters 304a, 304b. The first beam splitter 304a may be configured to transmit at least a portion of the reflected light beams 319a, 319b towards the second beam splitter 304b. The second beam splitter 304b, in turn, may reflect a portion and transmit a portion of the reflected light beam 319a. The reflected beam 319a reflected by second beam splitter 304b, in this embodiment, is directed toward an auto-correlation interferometer 340 over an auto correlation channel 323 to implement auto-correlation of reflections from the reference plate 310, and the surfaces 313a and 313b. The digital imager 334 is also coaxially disposed along the auto correlation channel 323 and is configured to receive light transmitted by the auto correlation interferometer 340 through the second beam splitter 304b. In the system 300a, the auto-correlation interferometer 340 may include a cavity having movable mirrors 341, 342. The mirrors 341 or 342 of auto-correlation interferometer 340 are movable along the optical axis such that the path differences between reflected light signal from reference plate 310 and those light reflections from surfaces 313a and 313b satisfy temporal coherence condition. By translating the mirror 341 and/or mirror 342 disposed in the auto-correlation interferometer 340, the reference plate reflection from moving the mirrors 341, 342 can be correlated to the fixed mirror reflections from various surfaces in the sample 330.

The first lens system 306 may be configured to receive the reflected light beam 319a and the light beam from the reflected and/or scattered off-axis light beam 319b off of the sample 312 through the first beam splitter 304a. The reflected light beams 319a, 319b are then transmitted towards the second beam splitter 304b, which reflects a portion thereof as an auto-correlator beam 319a on the auto correlation channel onto the digital imagers 334 and a remaining portion thereof through the imaging channel 322 onto the digital imager 336. The digital imagers 334, 336 may include image sensors. The image sensor may be a CMOS image sensor, a CCD image sensor, or other types of 1D- and 2D-array detectors. The digital imagers 334 and 336 may generate images 324 and 326 based on the reflected and scattered light beams 319a, 319b and pass the images to the processor system 338.

The processor system 338 may be analogous to and configured to operate in a similar manner as the processor system 128 of FIG. 1A. The processor system 338 may be implemented by any suitable mechanism, such as a program, software, function, library, software as a service, analog, or digital circuitry, or any combination thereof. In some embodiments, such as illustrated in FIG. 2, the processor system 228 may include a data acquisition module 250 and a processor and storage module 252. The processor and storage module 252 may include, for example, a microprocessor, microcontroller, digital signal processor (DSP), application-specific integrated circuit (ASIC), a Field-Programmable Gate Array (FPGA), or any other digital or analog circuitry configured to interpret and/or to execute program instructions and/or to process data.

Figure 6:
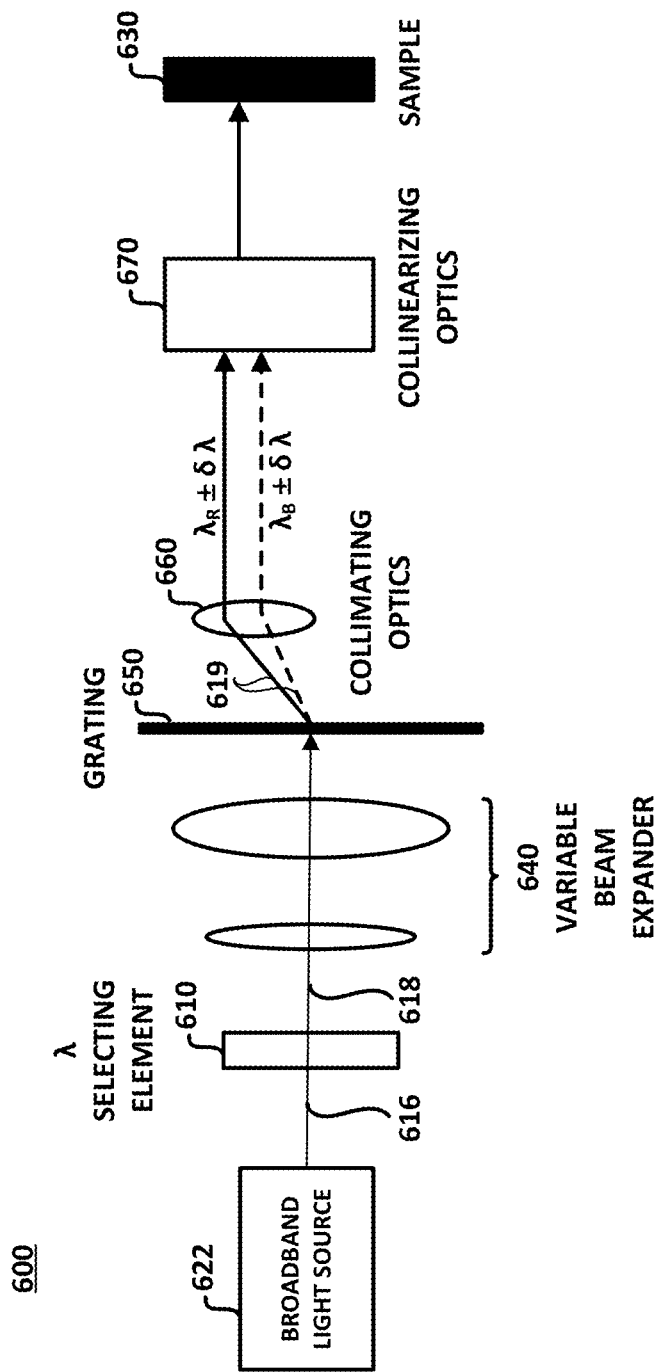
FIG. 6 illustrates tunable coherence length stretching that may be used in interferometer systems to measure topological features having a greater z-height profiles, according to another embodiment.

The systems depicted in FIGS. 1A, 2 and 3 may be used to measure minute heights of semiconductor features. However, the systems depicted in FIGS. 1A, 2 and 3 may also be configured to measure topologies having much greater height differentials measuring, for example, in millimeters. FIG. 6 illustrates tunable coherence length stretching that may be used in interferometer systems to measure topological features having a greater z-height profiles, according to another embodiment Referring to FIG. 6, broadband light source 622 may be configured to generate and to emit a light beam 616 at a particular wavelength or at several different wavelengths within a range of wavelengths over a period of time. In some embodiments, the broadband light source 622 and a co-axially disposed and optically coupled tunable filter 610 together provide a tunable light source. The broadband light source 622 may be configured to emit a broadband light beam 616 that includes wavelengths of light that may be used by the system 600 in FIG. 6. In some embodiments, the broadband light source 622 may be a light source such as a white light laser or ultra-broadband source such as an arc lamp or laser driven plasma source or a super luminescent diode (SLED). In some other embodiments, the broadband light source 622 may be configured to provide the broadband light beam with a Gaussian power spectrum. The tunable filter 610 may be configured to filter the broadband light beam 616 to generate a light beam 618 at a particular wavelength, thereby functioning as a λ selecting element, as shown in FIG. 6. In some embodiments, the tunable filter 610 may be tuned, such that the tunable filter 610 may filter out different wavelengths of light from the light beam 616 to generate a light beam 618 having simultaneously or successively multiple different wavelengths of light.

The tunable filter 610, according to an embodiment, may be configured to generate different wavelengths of light with a finite linewidth at each wavelength. The linewidth defines the temporal coherence length, $L_c$, of beam 618. The coherence length in turn determines the minimum height that could be measured by the interferometer channels 122a, 222a and 322, as described above. Tunable light source 622, 610 may be tuned such that light beam at each wavelength step has a definable or predetermined linewidth. The coherence length of the beam 618 may be tuned by tuning the linewidth of the laser beam. In turn, control of the linewidth may be achieved with interference filters with defined passbands or with grating elements such as shown at reference 650 in FIG. 6. In a grating-based wavelength selector, definable linewidth may be defined as $$\delta\lambda = \lambda/(m.\Sigma)$$

where m is the diffraction order and $\Sigma$ is the number of grooves intercepted by the incident beam. This can be re-written with known parameters pitch, p and beam diameter $\Phi$ as follows:

$$\delta\lambda = \lambda.p/(m.\Phi)$$

Coherence length of light in air is $$L_c = 0.66. \ \lambda^2/\delta\lambda$$

or in terms of pitch and beam diameter, $$L_c = 0.66. \ m.\lambda. \ \Phi/p$$

Thus, for a given pitch and diffraction order, the coherence length of light beam 619 at any wavelength, λ, may be stretched or tuned, according to an embodiment, by adjusting the diameter of the beam incident on the grating element 650 using a variable beam expander, as shown at 640 in FIG. 6.

In some embodiment of the invention, the light source 622 may be configured to generate beams 619 to accommodate coherence length requirement of surface features with differing z-height profile on the same sample through control of the wavelengths selected at 610 and through control, by the variable beam expander 640, of the diameter of the beam incident on the grating 650, thereby enabling imaging of differing z-height ranges on the same or different sample. The beams of light 619 may be collimated in collimating optics 660 and collinearized (e.g., aligned with one another) at 670 before being incident on sample 630. The sample 630 may be moving across the incident beam such that the beam sweeps across the entire or selected surfaces or areas of the sample or the sample may be immobile, and the optical system shown in FIG. 6 moved across the sample.

Figure 7:
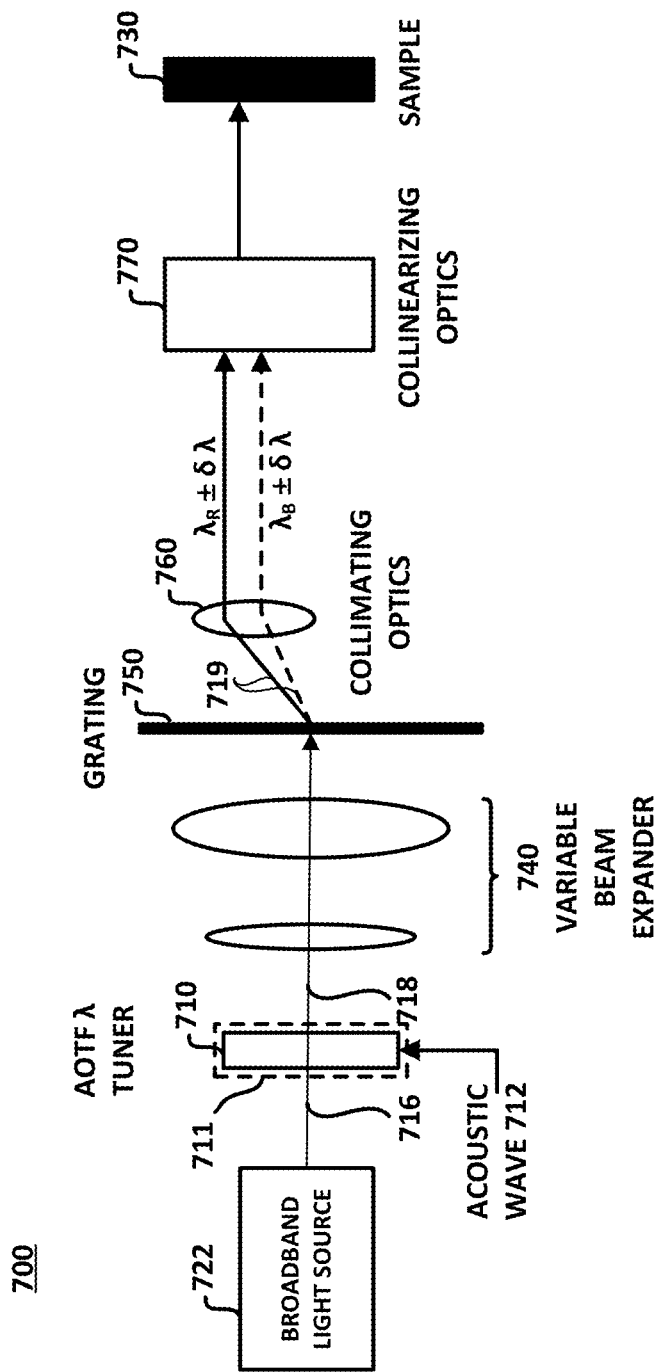
FIG. 7 illustrates tunable coherence length stretching with central wavelength stabilization that may be used in interferometer systems to measure topological features having a greater z-height profiles, according to yet another embodiment.

FIG. 7 illustrates tunable coherence length stretching with central wavelength stabilization that may be used in interferometer systems to measure topological features having a greater z-height profiles, according to yet another embodiment. As shown in FIG. 7, an optical piezoelectrical device such as, for example, an acousto-optic tunable filter (AOTF) 710 may be used as the wavelength selector 710. With AOTF, wavelength selection can be achieved in microseconds by varying/selecting an acoustic wave signal input to the AOTF 710. As shown, the broadband polychromatic or white light beam 716 emitted by broadband light source 722 is incident upon the AOTF λ tuner 710, which enables the rapid selection of a specific wavelength beam 718 from the incident 716 by varying the frequency of the acoustic wave 712 input to the AOTF 710.

Indeed, in AOTF, the wavelength selection is dependent on the frequency of the acoustic wave input to and propagating through the crystal in the tunable filter. This frequency is determined by the frequency of the transducer circuitry. It is possible to achieve drive frequency stability of ~1 ppm. Hence, a central wavelength, $\lambda_c$, with a stability on the order of ~1 to 10 ppm can be achieved. Furthermore, long term drift in $\lambda_c$ can be avoided by thermoelectrically (TE) cooling the AOTF crystal in the AOTF λ tuner 710, as suggested at reference 711 in FIG. 7.

Similarly, and as shown and described relative to FIG. 6, in the embodiment of FIG. 7, for a given pitch and diffraction order, the coherence length of light beam 719 at any wavelength, λ, can be stretched or tuned by adjusting the diameter of the beam incident on the grating element 750 using a variable beam expander, as shown at 740. Indeed, the light source 722 may be configured to generate beams 719 to accommodate coherence length requirement of surface features with differing z-height profile on the same sample through control of the wavelengths selected by AOTF λ tuner 710 and through control, by the variable beam expander 740, of the diameter of the beam incident on the grating 750, thereby enabling imaging of differing z-height ranges on the same or different sample. The beams of light 719 may be collimated in collimating optics 760 and collinearized (i.e., aligned with one another) at 770 before being incident on sample 730. The sample 730 may be moving across the incident beam such that the beam sweeps the entire or selected surfaces of the sample, or the sample may be immobile and the optical system shown in FIG. 7 moved across the sample.

In this manner, the embodiment in FIG. 7 that incorporates the AOTF λ tuner 710, the variable beam expander 740 and grating element 750 enables the generation of a laser beam whose coherence length is tunable and whose central wavelength stable is highly stable. Moreover, the embodiment shown in FIG. 7 enables a broadband source 722 that can be swept to produce a multitude of spectral lines, each with high wavelength stability and coherence length tunability. The height of the raised surface (or receded surface as the two terms are used interchangeably herein) of the sample may then be measured in a manner and using devices and structures that are similar to that discussed relative to FIGS. 1A and 3, based upon the intensities of the light reflected from the sample.

Figures 8A, 8B:
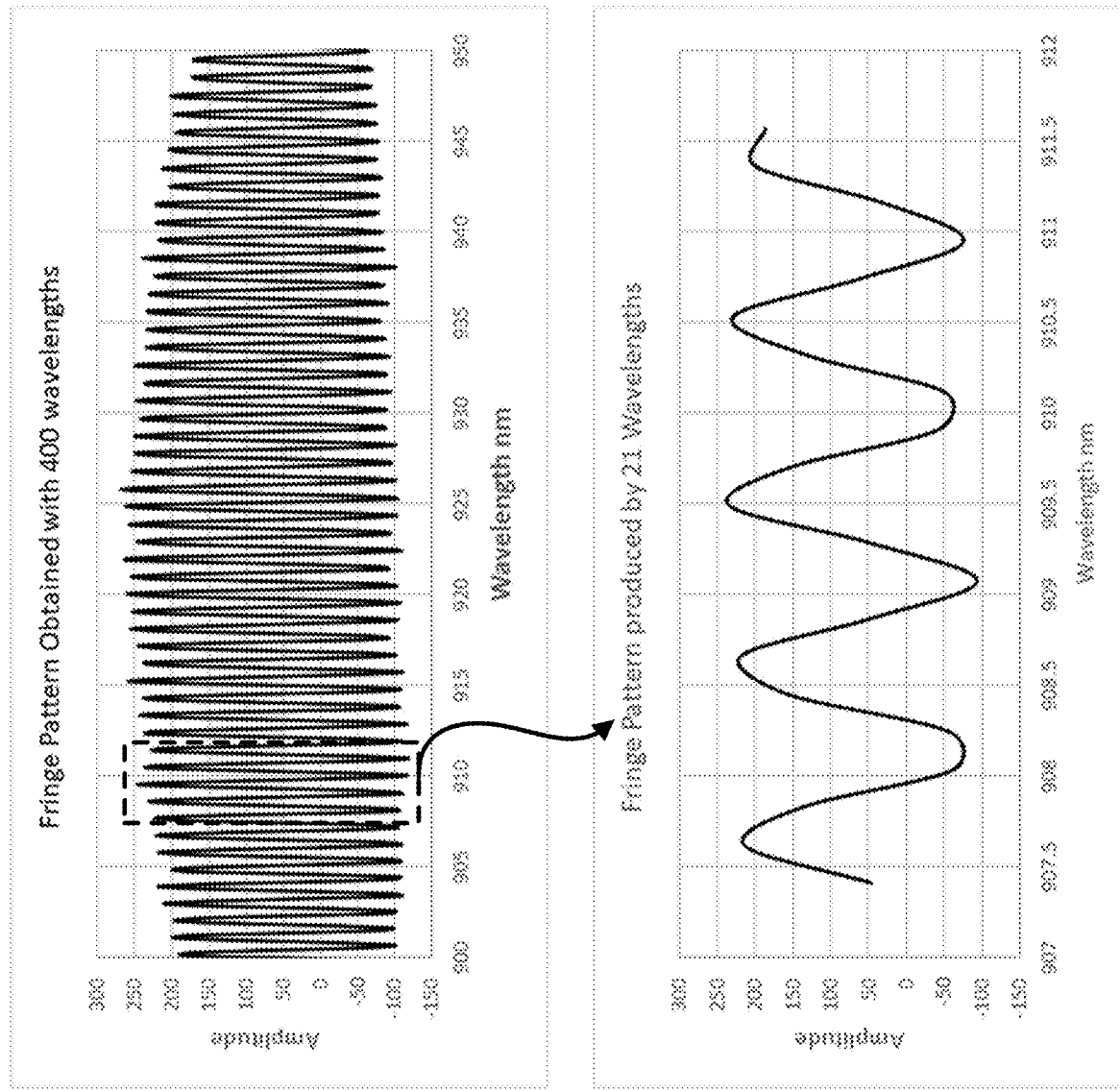
FIG. 8A shows a fringe pattern obtained with 400 wavelengths of light, to illustrate additional aspects of embodiments.
FIG. 8B shows an interference fringe pattern obtained with 21 wavelengths of light, to illustrate additional aspects of embodiments.

Returning now to FIG. 1, in some embodiments, the processor system 128 may use the different intensities of the reflected beams 119a of different images to determine the distance between the raised surface feature 113a and the floor surface 113b. For example, in some embodiments, the processor system 128 may extract the grayscale value, representing an intensity value, for a corresponding (e.g., same) pixel of each image 126. The corresponding pixel in each image 126 may correspond with a particular pixel element in the digital imager 116. Thus, a particular pixel in each image 126 may be generated from the same pixel element in the digital imager 116. The grayscale values for the particular pixel in each image 126 may be plotted to form a fringe pattern with a sinusoidal waveform, a modulated sinusoidal waveform, or a complex waveform. For example, the intensity values of a particular pixel from different images may be plotted along the y-axis and the wavelength of the light beam 118a used to generate the different images may be plotted along the x-axis, as shown in FIG. 8A. In these and other embodiments, the distance $D_1$ between the reference plate 110 and the raised (or receded) surface feature 113a and the distance $D_2$ between the reference plate and floor surface 113b at a particular point corresponding to the particular pixel may be determined based on the fringe patterns. FIG. 8A shows the fringe pattern formed by plotting the intensity values for a particular pixel from different images using 400 wavelengths and FIG. 8B shows the fringe pattern formed by plotting the intensity values for a particular pixel from different images using 21 of the wavelengths of FIG. 8A ranging between about 907.5 nm to about 911.5 nm.

According to one embodiment, after these spectral interference signals (interferograms) are captured, they may be uniformly resampled in the wavenumber ($2\pi/\lambda$) space (k-space) using existing interpolation techniques. Fast Fourier Transform (FFT) of the k-space interferogram can be used to retrieve distance information. Other discrete frequency domain transforms may also be used. Analytically, this k-space fringe pattern may be algebraically expressed using an ABC model as $$I(k)=A[1+B\cdot \cos(C)]$$

where,
$A=(I_{max}+I_{min})/2$ is the DC amplitude of the fringe pattern,
$B=(I_{max}-I_{min})/(I_{max}+I_{min})$ is the fringe visibility,
and $C=2k\cdot d$, is the phase factor at each wavelength for distance d.

According to embodiments, fringe patterns such as shown in FIG. 8A may be constructed by acquiring intensity data for a particular pixel using one wavelength at a given time. Therefore, it follows that the time required to acquire the interferogram is directly proportional to the number of wavelengths used. Since the scanning stage on which the sample under measurement is kept is continuously moving, surface sampling size will depend on data acquisition time. To improve sample pixel size, it is important to keep data acquisition time to a minimum, as it is undesirable to slow down the scanning stage. In turn, this means fewer number of fringes per sample size. An example of a limited number of fringes is shown in FIG. 8B. The depth profile obtained by Fourier transforming interference fringes will exhibit an axial resolution that is in direct correlation to the number of data points in the fringe pattern and the number of fringes.

In some other embodiment where a grating spectrometer is used, the detector size may be such that the spectrometer can output only a limited number of spectral fringes. To address this limitation, one embodiment is a method of improving axial resolution of interferometric measurements where only a limited number of spectral fringe data are available. According to one embodiment, the goal of improving the axial resolution of interferometric measurements obtained with only a limited number of spectral fringe data may be achieved by extending the acquired, limited number of wavelengths, spectral fringe pattern to a larger wavelength domain by appending the measured data with estimated spectral data. This estimated spectral data may be generated using the A, B and C coefficients of the ABC model above. The ABC coefficients may be determined from the measured spectral fringe data and by calculating the k-space intensities I(k)s at the added synthetic extension wavelengths.

Figure 9A:
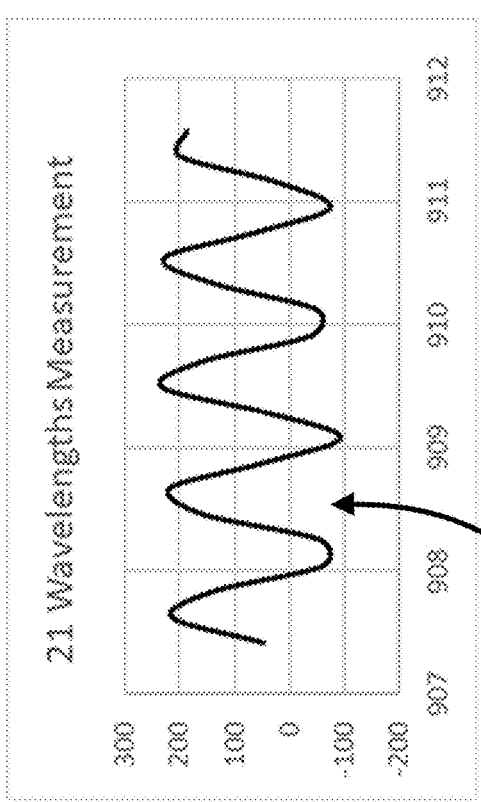
FIG. 9A shows an interference fringe pattern obtained with 21 wavelengths of light and FIG. 9B shows the relatively low axial resolution obtainable therefrom.

The axial resolution of interferometric measurements taken in a medium with refractive index n is $L_r=0.5\cdot \lambda^2/(n\cdot \Delta\lambda)$. $\Delta\lambda$ is the spectral bandwidth, with larger bandwidths correlating with higher measured axial resolutions. One exemplary implementation of spectral extension according to an embodiment is illustrated using the short fringe pattern (based upon a limited number of wavelengths) given in FIG. 9A and extended fringe pattern in FIG. 10A. As shown in FIG. 9A, the short fringe pattern has 21 wavelengths ($\Delta\lambda=4.15$ nm) and as shown in FIG. 10A, the extended fringe pattern has 128 wavelengths ($\Delta\lambda=26.6$ nm, N=128), meaning that in FIG. 10A, estimated interference fringe patterns equivalent to 107 additional wavelengths were appended to the measured interference fringe patterns of the 21 original wavelengths of FIG. 9A.

The step of resolving the extended spectrum to retrieve the depth profile may comprise use of a Fast Fourier Transform (FFT) or Hilbert Transform or model-based fringe analysis techniques.

Figure 9B:
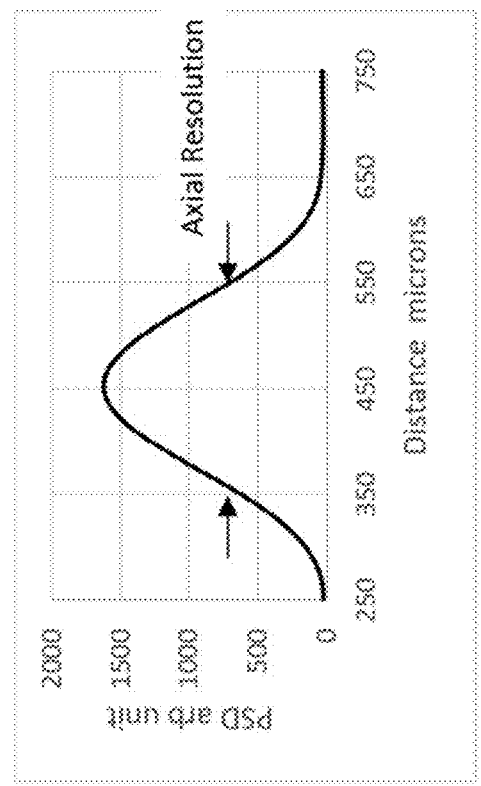
Figure 10A:
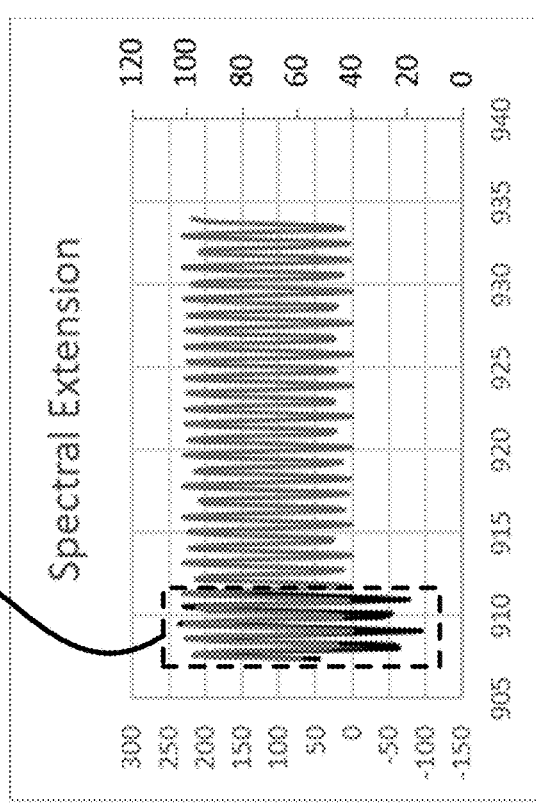
FIG. 10A shows an interference fringe pattern obtained using 21 wavelengths of light, extended by estimated spectral data to simulate an interference fringe pattern obtained using a greater number of wavelengths of light.
Figure 10B:
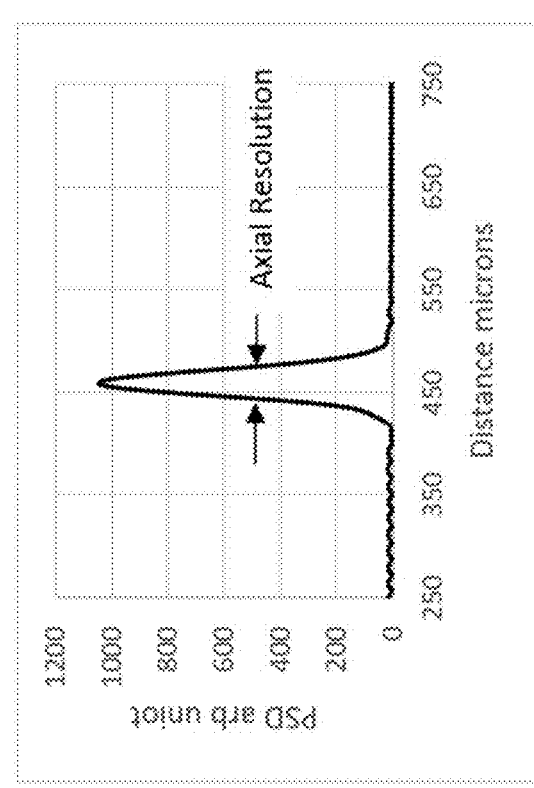
FIG. 10B shows the comparably higher axial resolution obtainable from the extended spectral extension of FIG. 10A.

FIG. 9B and FIG. 10B show the power spectral density (PSD) obtained from a FFT of the k-space interferogram obtained from spectral fringes in FIG. 9A and FIG. 10A, respectively. As can be seen from FIGS. 9B and 10B, the spectral extension technique described herein enhances the axial resolution of the interferometer without, however, increasing acquisition times and without increasing the number of wavelengths used and increasing the consequent data acquisition time or reducing the speed of the sample stage. Indeed, as shown the PSD shown in FIG. 10B is advantageously and substantially narrower than the PSD shown in FIG. 10B, obtained from the spectral extension technique discussed above. Although the spectra was increased from N=21 in FIG. 9A to N=128 in FIG. 10A, the use of N=128 was for illustrative purposes only, as N can be any integer.

An iterative process may be employed to minimize a least-square criterion between the estimated interference pattern and the measured interference pattern.

In the embodiments presented herein, any error introduced by spectral extension technique will be mitigated in the height or depth measurements, since these measurements are obtained by calculating the differences in the distances measured between the reference plate surface and the sample surfaces. Moreover, in these and other embodiments, any error introduced in absolute distance measurements by the spectral extension technique disclosed and shown therein is a fixed bias error that may be readily canceled out using calibration standards.

The present spectral extension embodiments may be implemented in differential metrology applications that employ swept source interferometric spectrometry. In High Volume Manufacturing, the wafer throughput (Wph) is directly proportional to the number of wavelengths λs employed in making the measurements. Fewer λs will speed up measurements but lead to reduced axial resolution. With the spectral extension method using ABC model disclosed herein, however, both Wph and enhancements in depth resolution enhancements are achieved.

Terms used in this disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description of embodiments, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in this disclosure are intended for pedagogical objects to aid the reader in understanding the invention and the concepts contributed by the inventor to furthering the art and are to be construed as being without limitation to such specifically recited examples and conditions. Although embodiments of the present disclosure have been described in detail, it should be understood that various changes, substitutions, and alterations could be made hereto without departing from the spirit and scope of the present disclosure.

What is claimed is:

1. A method of improving axial resolution of interferometric measurements of a raised feature and a floor feature of a sample, the method comprising:
   illuminating the features of the sample using a first limited number of successively different wavelengths of light at a time;
   generating an image of at least the feature based on intensities of light reflected from the feature at each of the successively different wavelengths of light;
   measuring a fringe pattern of intensity values for each corresponding pixel of the generated images;
   resampling the measured fringe patterns as k-space interferograms by modelling the k-space interferograms using an algebraic model of k-space intensities having a plurality of coefficients and using the plurality of coefficients to generate the estimated fringe patterns, the algebraic model of k-space intensities being expressed as $I(k)=A[1+B \cdot Cos(C)]$, where, $A=(I_{max}+I_{min})/2$ is a DC amplitude of the plotted fringe pattern, $B=(I_{max}-I_{min})/(I_{max}+I_{min})$ is a fringe visibility, and where $C=2k.d$, is the phase factor at each wavelength for a distance d;
   estimating interference fringe patterns for a spectral range that is longer than available from the generated images based on the first limited number of successively different wavelengths of light using the k-space interferograms;
   appending the estimated interference fringe patterns to the respective measured fringe patterns of intensity values generated from illuminating the raised feature of the sample using the first limited number of successively different wavelengths of light;
   measuring the height of the raised feature using the measured interference fringe patterns and appended estimated fringe patterns with improved axial resolution to simulate the effects of illuminating a top and a floor of the raised feature of the sample using a second limited number of successively different wavelengths of light, the second limited number of successively different wavelengths of light being greater than the first limited number of successively different wavelengths of light.

2. The method of claim 1, wherein measuring the height of the raised feature includes applying a discrete frequency domain transformation to the plotted interference fringe pattern and appended estimated fringe patterns.

3. The method of claim 1, wherein measuring the height of the raised feature includes applying a model-based fringe analysis technique.

4. The method of claim 2, wherein the discrete frequency domain transformation is one of a Fast Fourier Transform (FFT) and a Hilbert Transform.

5. The method of claim 1, wherein measuring the height of the raised feature using the plotted interference fringe pattern and appended estimated fringe patterns introduces a fixed bias error and wherein the method further comprises cancelling out the introduced fixed bias error.

6. The method of claim 1, wherein illuminating is carried out by a light source and wherein the method comprising moving the sample past the light source at a first speed that is proportional to first limited number of successively different wavelengths of light and not at second, slower speed proportional to the second limited number of successively different wavelengths of light.

7. The method of claim 1, further comprising carrying out an iterative process to minimize a least-square criterion between measured interference fringe patterns and the appended estimated fringe patterns.

* * * * *